US009621257B2

(12) United States Patent
O'Neill et al.

(10) Patent No.: US 9,621,257 B2
(45) Date of Patent: *Apr. 11, 2017

(54) ROBUST BEAM SWITCH SCHEDULING

(71) Applicant: ViaSat Inc., Carlsbad, CA (US)

(72) Inventors: John Hai O'Neill, Carlsbad, CA (US); Donald W. Becker, Rancho Santa Fe, CA (US); Mark J. Miller, Vista, CA (US)

(73) Assignee: ViaSat, Inc., Carlsbad, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/567,854

(22) Filed: Dec. 11, 2014

(65) Prior Publication Data

US 2015/0295639 A1    Oct. 15, 2015

Related U.S. Application Data

(63) Continuation of application No. PCT/US2013/044153, filed on Jun. 4, 2013, which is
(Continued)

(51) Int. Cl.
*H04B 7/204* (2006.01)
*H04B 7/185* (2006.01)
(Continued)

(52) U.S. Cl.
CPC ....... *H04B 7/2041* (2013.01); *H04B 7/18513* (2013.01); *H04B 7/18515* (2013.01);
(Continued)

(58) Field of Classification Search
None
See application file for complete search history.

(56) References Cited

U.S. PATENT DOCUMENTS 5,448,623 A    9/1995  Wiedeman et al.
5,526,404 A    6/1996  Wiedeman et al.
(Continued)

FOREIGN PATENT DOCUMENTS

AU    2012347615 B2    5/2016
AU    2012347621 B2    5/2016
(Continued)

OTHER PUBLICATIONS

Advanced Communications Technology Satellite (ACTS), Technology: Spacecraft, https://acts.grc.nasa.gov/technology/spacecraft/index.shtml, retrieved on Jul. 27, 2012, 2 pgs.
(Continued)

*Primary Examiner* — Andrew Lai
*Assistant Examiner* — Jamaal Henson
(74) *Attorney, Agent, or Firm* — Marsh Fischmann & Breyfogle LLP; Daniel J. Sherwinter

(57) ABSTRACT

Systems and methods are described for robust scheduling of beam switching patterns in satellite communications systems. Embodiments operate in context of a hub-spoke satellite communications architecture having a number of gateway terminals servicing large numbers of user terminals over a number of spot beams. The satellite includes switching subsystems that distribute capacity to the user beams from multiple of the gateway terminals in a shared manner according to a beam group switching pattern. The beam group switching pattern is robustly formulated to continue distributing capacity during gateway outages (e.g., when one or two gateway terminals are temporarily non-operational due to rain fade, equipment failure, etc.). For example, the beam group switching pattern can be formulated to minimize worst-case degradation of capacity across user beams, to prioritize certain beams or beam groups, etc.

33 Claims, 21 Drawing Sheets

Related U.S. Application Data a continuation of application No. 13/902,737, filed on May 24, 2013, now Pat. No. 8,805,275.

(60) Provisional application No. 61/791,059, filed on Mar. 15, 2013, provisional application No. 61/658,273, filed on Jun. 11, 2012, provisional application No. 61/658,269, filed on Jun. 11, 2012.

(51) Int. Cl.
*H04W 72/12* (2009.01)
*H04W 76/02* (2009.01)
*H04W 88/16* (2009.01)

(52) U.S. Cl.
CPC ..... *H04W 72/121* (2013.01); *H04W 72/1263* (2013.01); *H04W 76/02* (2013.01); *H04W 88/16* (2013.01)

(56) References Cited

U.S. PATENT DOCUMENTS

| | | | |
|---|---|---|---|
| 5,586,165 A | 12/1996 | Wiedeman | |
| 5,594,780 A | 1/1997 | Wiedeman et al. | |
| 5,991,279 A | 11/1999 | Haugli et al. | |
| 6,201,961 B1 | 3/2001 | Schindall et al. | |
| 6,301,476 B1 | 10/2001 | Monte et al. | |
| 6,377,561 B1 | 4/2002 | Black et al. | |
| 6,522,643 B1 | 2/2003 | Jacomb-Hood et al. | |
| 6,625,129 B1 | 9/2003 | Olds et al. | |
| 6,801,565 B1 | 10/2004 | Bottomley et al. | |
| 6,898,428 B2 | 5/2005 | Thorburn et al. | |
| 6,957,078 B1 | 10/2005 | Yousefi et al. | |
| 6,973,287 B2 * | 12/2005 | Franzen ............... | H04B 7/2041 370/316 |
| 6,992,992 B1 | 1/2006 | Cooper et al. | |
| 7,237,026 B1 | 6/2007 | Synnestvedt | |
| 7,773,942 B2 * | 8/2010 | Hudson .............. | H04B 7/18515 342/352 |
| 8,144,643 B2 | 3/2012 | Miller et al. | |
| 8,218,476 B2 | 7/2012 | Miller | |
| 8,340,015 B1 | 12/2012 | Miller et al. | |
| 8,340,016 B1 | 12/2012 | Miller et al. | |
| 8,509,144 B2 | 8/2013 | Miller et al. | |
| 8,542,629 B2 | 9/2013 | Miller | |
| 8,805,275 B2 | 8/2014 | O'Neill et al. | |
| 2001/0007552 A1 | 7/2001 | Schiff | |
| 2002/0031103 A1 | 3/2002 | Wiedeman et al. | |
| 2002/0159403 A1 | 10/2002 | Reddy | |
| 2003/0083851 A1 | 5/2003 | Nagamune | |
| 2003/0109983 A1 | 6/2003 | Takenaga | |
| 2004/0066347 A1 * | 4/2004 | Schiff ................ | H04B 7/18534 343/776 |
| 2004/0166801 A1 | 8/2004 | Sharon et al. | |
| 2005/0197060 A1 | 9/2005 | Hedinger et al. | |
| 2006/0126552 A1 | 6/2006 | Lee et al. | |
| 2007/0109985 A1 | 5/2007 | Wiedeman et al. | |
| 2007/0135051 A1 | 6/2007 | Zheng et al. | |
| 2008/0146145 A1 | 6/2008 | Pateros et al. | |
| 2009/0023384 A1 | 1/2009 | Miller | |
| 2010/0222081 A1 | 9/2010 | Ward et al. | |
| 2013/0182790 A1 | 7/2013 | Jalali et al. | |
| 2013/0331026 A1 | 12/2013 | O'Neill et al. | |

FOREIGN PATENT DOCUMENTS

| | | |
|---|---|---|
| EP | 1168670 A2 | 1/2002 |
| EP | 1328076 A2 | 7/2003 |
| EP | 2789109 B1 | 3/2016 |
| WO | WO-98/32245 A1 | 7/1998 |
| WO | WO-02/11302 A2 | 2/2002 |
| WO | WO-04/002016 A2 | 12/2003 |
| WO | WO-2011/139991 A1 | 11/2011 |
| WO | WO-2013/086332 A2 | 6/2013 |
| WO | WO-2013/086338 A1 | 6/2013 |
| WO | WO-2013/188178 A1 | 12/2013 |

OTHER PUBLICATIONS

Advanced Communications Technology Satellite (ACTS), Technology: Spacecraft—On-Board Baseband Processing (BBP) and Switching, https://acts.grc.nasa.gov/technolooy/spacecraft/bbp.shtml, retrieved on Jul. 27, 2012, 2 pgs.

Advanced Communications Technology Satellite (ACTS), Technology: Spacecraft—Microwave Switch Matrix (MSM), https://acts.grc.nasa.gov/technology/spacecraft/msm.shtml, retrieved on Jul. 27, 2012, 1 pg.

Advanced Communications Technology Satellite (ACTS), Technology: Spacecraft—Multiple Hopping Beam Antennas, https://acts.grc.nasa.gov/technology/spacecraft/multihop.shtml, retrieved on Jul. 27, 2012, 2 pgs.

Advanced Communications Technology Satellite (ACTS), Technology: Spacecraft—Adaptive Rain Fade Compensation, https://acts.grc.nasa.gov/technology/spacecraft/rainfade.shtml, retrieved on Jul. 27, 2012, 2 pgs.

Advanced Communications Technology Satellite (ACTS), Technology: Spacecraft—Specifications, https://acts.grc.nasa.gov/technology/spacecraft/specs.shtml, retrieved on Jul. 27, 2012, 6 pgs.

Advanced Communications Technology Satellite (ACTS), Technology: Earth Stations, https://acts.grc.nasa.gov/technology/earthstations/index.shtml, retrieved on Jul. 27, 2012, 2 pgs.

Advanced Communications Technology Satellite (ACTS) Technology: System Overview, http://acts.grc.nasa.gov/technology/index.shtml, retrieved on Jul. 27, 2012, 2 pgs.

Arnold et al., Mobile Communications in a Geosynchronous Regenerative Satellite Mesh (RSM) System, Hughes Network Systems, 2006, 6 pgs.

Berk et al., On-Board Processing for Future Satellite Communications Systems: Comparison of FDM, TDM, and Hybrid Accessing Schemes, MTR 8701, MITRE, Jun. 1982, 192 pgs.

Couchman et al., Defocused Array Fed Reflector Antennas for Ka, Broad Band Satellites, 2005, 8 pgs.

EMS Technologies, Inc., Beam Forming Networks, Application Note, Revision B, Aug. 2004, 36 pgs.

Franchi et al., Technology Trends and Maket Drivers for Broadband Mobile Via Satellite: Inmarsat BGAN, Inmarsat, 2001, 9 pgs.

Gedney et al. Advanced Communications Technology Satellite (ACTS), NASA Lewis Research Center, IEEE, 1989, pp. 1566-1577.

Gedney et al., ACTS Technology Description and Results, NASA/CR-2000-209806, National Aeronautics and Space Administration, Glenn Research Center, Prepared under Contract NAS3-23790, Feb. 2000, 158 pages.

Gopal et al., Technology Readiness of Future Generation Networks Leveraging Regenerative Satellite Mesh Architecture—A Spaceway Perspective, Hughes Network Systems, LLC, 2006, 7 pgs.

Gopal, Rajeev, Innovations in Satellite Networking Technology and Products, SIA, Hughes, Dec. 7, 2006, 10 pgs.

Gopal et al., Regenerative Satellite Mesh System for Real-Time Multi-Party Multimedia Traffic, Hughes Network Systems, LLC (Hughes), 2009, 9 pgs.

Hadinger et al., Next Generation High Capacity Ka-Band Satellite Systems, Northrop Grumman Space Technology, 13$^{th}$ Ka and Broadband Communications Conference, Sep. 24-26, 2007, pp. 1-8.

Intellect, Satellite Provision of Next Generation Broadband Services in UK, Prepared for the Broadband Stakeholder Group, Information Technology Telecommunications and Electronics Association, Oct. 29, 2007, pp. 1-27.

Kitao et al., Proto-flight Model Development of the Multi-beam Active Phased Array Antenna for WINDS, 2007, 4 pgs.

Krawczyk, et al., The Advanced Communications Technology Satellite—Performance, Reliability and Lessons Learned, NASA-Glenn Research Center, ACTS Conference 2000 Proceedings, pp. 175-184.

(56) References Cited

OTHER PUBLICATIONS

Lowry et al., Advanced Communications Technology Satellite. System Handbook, National Aeronautics and Space Administration, NASA TM-101490, Revisions Sep. 30, 1993, 126 pages.
Mallison et al., Enabling Technologies for the Eurostar Geomobile Satellite, 19th AIAA International Communications Satellite Systems Conference. ICSSC, 2001, 10 pgs.
Nelson, Joel, Top Satellite Technology at Forefront, Boeing Frontiers, 1(3), 2002, 5 pgs.
Ogawa et al., Wideband InterNetworking Engineering Test and Demonstration Satellite (WINDS), National Institute of Information and Communications Technology, vol. 54, No. 4, Sections 1-7, 2007, http://www.eoportal.org/directory/pres_WINDSWidebandInterNetworkingengineeringteststand-DemonstrationSatellite.html, retrieved on Jul. 27, 2012, 190 pgs.
Reudink, D.O. et al., A Scanning Spot-Beam Satellite System, Bell System Technical Journal, vol. 56, No. 8, Oct. 1977, pp. 1549-1560.
Rooney, Kevin J., Evolving Satellite Markets and their Enabling Technologies, Boeing Satellite Systems, Oct. 2002, pp. 1-18.
Roper et al., WGS Phased Arrays Support Next Generation DOD SATCOM Capability. IEEE International Symposium on Phased Array Systems and Technology, 2003, pp. 82-87.
Rustako, et al., An Experimental Scanning Spot Beam Satellite System Implementing 600 Mbit/Sec TDMA, Beli Laboratories, Sixth International Conference on Digital Satellite Communications, IEEE Catalog No. 83CH1848-1, Library of Congress Catalog No. 82-84272, Sep. 19-23, 1983, 7 pgs.
Science Applications International Corporation, Satellite Communications Technology Database, National Aeronautics and Space Administration, Glenn Research Center, Prepared under Contract NAS3-26565, NASA/CR-2001-210563/PART2, Mar. 2001, 71 pgs.
Signatron, Inc., 30/20 GHz FSS Feasibility Study Final Report, JPL Contract No. 957641, Prepared for Jet Propulsion Laboratory, Feb. 12, 1987, 296 pages.
Stone, John, Spaceway 3 Takes Flight, Near Earth LLC, Aug. 2007, 4 pgs.
Sunderland et al., Megagate ASICs for the Thuraya Satellite Digital Signal Processor, Proceedings of the International Symposium on Quality Electronic Design, IEEE, Computer Society, 2002, 8 pgs.
Thompson et al., Concepts and Technologies for a Terabits Satellite, SPACOMM 2011: The Third International Conference on Advances in Satellite and Space Communications, IARIA, ISBN: 978-1-61208-128-1, Apr. 2011, pp. 12-19.
Torlak et al., Fast Estimation of Weight Vectors to Optimize Multi-Transmitter Broadcast Channel Capacity. IEEE Transactions on Single Processing, vol. 46, No. 1, Jan. 1998, pp. 243-246.
Whitefield et al., Spaceway Now and in the Future: On-Board IP Packet Switching Satellite Communication Network, Hughes Network Systems, LLC, 2006, 7 pgs.
WINDS (Wideband InterNetworking Engineering Test and Demonstration Satellite), http://www.eoportal.org/directory/pres_WINDSWidebandInterNetworkingengineeringteststand-DemonstrationSatellite.html, retrieved on Jul. 27, 2012, 14 pgs.
Winds Project Team, "Kizuna" (WINDS) (Wideband InterNetworking engineering test and Demonstration Satellite) (Launched by H-IIA F14), Office of Space Applications Japan Aerospace Exploration Agency, 2008, 17 pgs.
International Search Report and Written Opinion mailed in International Application No. PCT/US2010/026934 on May 11, 2010, 10 pgs.
International Preliminary Report on Patentability mailed in International Application No. PCT/US2010/026934 on Sep. 27, 2011, 9 pgs.
International Search Report and Written Opinion mailed in International Application No. PCT/US2011/034845 on Aug. 26, 2011, 5 pgs.
International Preliminary Report on Patentability mailed in International Application No. PCT/US2011/034845 on Nov. 6, 2012, 4 pgs.
International Search Report and Written Opinion mailed in International Application No. PCT/US2012/048668 on Oct. 19, 2012, 8 pgs.
International Preliminary Report on Patentability mailed in International Application No. PCT/US2012/048668 on Feb. 4, 2014, 5 pgs.
International Search Report and Written Opinion mailed in International Application No. PCT/US2012/068471 on Apr. 12, 2013, 8 pgs.
International Preliminary Report on Patentability mailed in International Application No. PCT/US2012/068471 on Jun. 10, 2014, 6 pgs.
International Search Report and Written Opinion mailed in International Application No. PCT/US2013/044153 on Sep. 16, 2013, 9 pgs.
International Preliminary Report on Patentability mailed in International Application No. PCT/US2013/044153 on Dec. 16, 2014, 6 pgs.

* cited by examiner

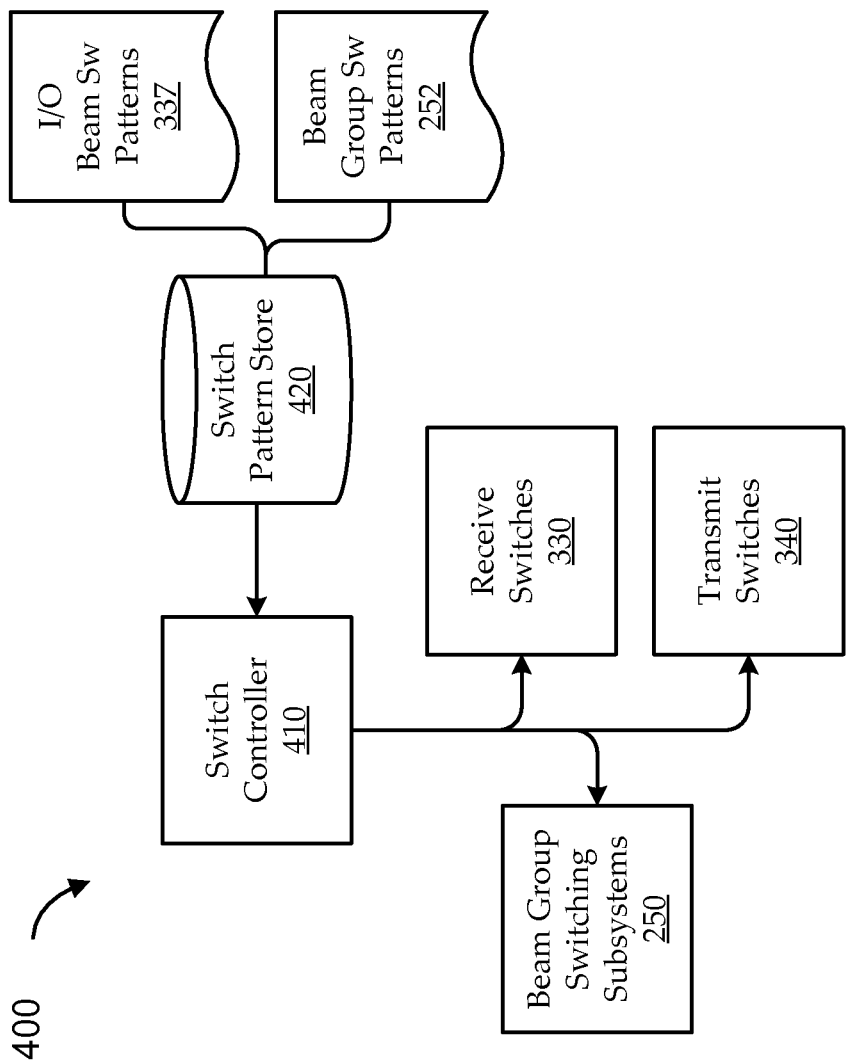

| Time Slot | Link Schedule | | | | | | | | Pass-Through Matrix Switch Schedule | | | |
|---|---|---|---|---|---|---|---|---|---|---|---|---|
| | User Link Schedule | | | | Gateway Link Schedule | | | | Output Port for Input | | | |
| | Grp 1 | Grp 2 | Grp 3 | Grp 4 | Grp 1 | Grp 2 | Grp 3 | Grp 4 | Input1 | Input2 | Input3 | Input4 |
| 0 | U1 | U11 | D12 | D14 | D1 | D10 | U12 | U14 | 1 | 2 | 3 | 4 |
| 1 | U3 | U11 | D13 | U14 | D1 | D10 | U12 | D14 | 1 | 2 | 3 | 4 |
| 2 | D9 | D10 | D13 | U14 | U1 | U10 | U12 | U14 | 1 | 2 | 3 | 4 |
| 3 | U5 | U11 | D13 | U14 | D1 | U10 | D12 | D14 | 1 | 2 | 3 | 4 |
| 4 | U8 | D11 | U13 | U14 | U1 | U10 | D12 | U14 | 1 | 2 | 3 | 4 |
| 5 | D9 | D10 | U13 | U14 | D1 | D10 | D12 | D14 | 1 | 2 | 3 | 4 |
| 6 | U2 | U11 | U12 | U15 | D1 | U10 | U12 | D14 | 1 | 2 | 3 | 4 |
| 7 | U9 | U10 | D12 | U15 | U1 | D10 | D12 | U14 | 1 | 2 | 3 | 4 |
| 8 | U1 | D10 | U12 | U14 | D1 | U10 | U12 | D14 | 1 | 2 | 3 | 4 |
| 9 | D5 | U11 | U12 | U15 | U1 | D10 | U12 | U14 | 1 | 2 | 3 | 4 |
| 10 | U6 | U11 | D12 | U14 | D1 | U10 | D12 | D14 | 1 | 2 | 3 | 4 |
| 11 | D8 | D11 | D12 | U15 | U1 | D10 | D12 | U14 | 1 | 2 | 3 | 4 |
| 12 | U3 | D11 | U13 | D14 | D1 | U10 | U12 | D14 | 1 | 2 | 3 | 4 |
| 13 | D6 | D11 | U13 | U14 | U1 | D10 | D12 | U14 | 1 | 2 | 3 | 4 |
| 14 | U3 | U11 | D13 | D14 | D1 | U10 | U12 | D14 | 1 | 2 | 3 | 4 |
| 15 | U9 | D10 | U13 | U15 | D1 | U10 | D12 | U14 | 1 | 2 | 3 | 4 |

| Time Slot | Link Schedule ||||||||| Pass-Through Matrix Switch Schedule ||||
| | User Link Schedule |||| Gateway Link Schedule |||| Output Port for Input ||||
| | Grp 1 | Grp 2 | Grp 3 | Grp 4 | Grp 1 | Grp 2 | Grp 3 | Grp 4 | Input1 | Input2 | Input3 | Input4 |
|---|---|---|---|---|---|---|---|---|---|---|---|---|
| 0 | U1 | U11 | D12 | D14 | D1 | D10 | U12 | U14 | 1 | | | |
| 1 | U3 | U11 | D13 | U14 | D1 | D10 | U12 | D14 | 1 | 2 | 3 | |
| 2 | D9 | U10 | D13 | D14 | U1 | D10 | U12 | D14 | 1 | 2 | 3 | 4 |
| 3 | U5 | D10 | U13 | U14 | D1 | U10 | D12 | D14 | 1 | 2 | 3 | |
| 4 | U8 | U11 | U13 | U15 | D1 | U10 | D12 | D14 | 1 | | 3 | 4 |
| 5 | D9 | D11 | U12 | U14 | U1 | U10 | D12 | D14 | 1 | 2 | | |
| 6 | U2 | D10 | D12 | U15 | D1 | U10 | U12 | U14 | 1 | 2 | 3 | 4 |
| 7 | U9 | D10 | U12 | D14 | D1 | D10 | D12 | D14 | 1 | 2 | 3 | 4 |
| 8 | U1 | U11 | D13 | U15 | U1 | D10 | U12 | U14 | 1 | 2 | 3 | 4 |
| 9 | D5 | D10 | U12 | U14 | D1 | U10 | D12 | D14 | 1 | 2 | 3 | 4 |
| 10 | U6 | U11 | U13 | D14 | U1 | D10 | U12 | U14 | 1 | 2 | 3 | 4 |
| 11 | D8 | D11 | U12 | U15 | D1 | D10 | D12 | D14 | 1 | | 3 | |
| 12 | U3 | D11 | D12 | D14 | D1 | U10 | U12 | U14 | 1 | 2 | 3 | 4 |
| 13 | D6 | D11 | U13 | U15 | U1 | D10 | D12 | D14 | 1 | 2 | | 4 |
| 14 | U3 | U11 | D13 | D14 | D1 | U10 | D12 | U14 | 1 | 2 | 3 | |
| 15 | U9 | D10 | U13 | U15 | D1 | U10 | D12 | D14 | 1 | 2 | 3 | 4 |

| Time Slot | Link Schedule | | | | | | | | | Robust Matrix Switch Schedule | | | |
|---|---|---|---|---|---|---|---|---|---|---|---|---|---|
| | User Link Schedule | | | | Gateway Link Schedule | | | | | Output Port for Input | | | |
| | Grp 1 | Grp 2 | Grp 3 | Grp 4 | Grp 1 | Grp 2 | Grp 3 | Grp 4 | | Input1 | Input2 | Input3 | Input4 |
| 0 | U1 | U11 | D12 | D14 | D1 | D10 | U12 | U14 | | 2 | 1 | 4 | 3 |
| 1 | U3 | U11 | D13 | U14 | D1 | D10 | U12 | D14 | | 2 | 4 | 3 | 1 |
| 2 | D9 | U10 | D13 | D14 | U1 | D10 | U12 | U14 | | 1 | 2 | 4 | 3 |
| 3 | U5 | D10 | D13 | D14 | D1 | U10 | D12 | U14 | | 4 | 2 | 3 | 1 |
| 4 | U8 | U11 | U13 | U15 | D1 | U10 | D12 | D14 | | 1 | 3 | 2 | 4 |
| 5 | D9 | U11 | U13 | U14 | D1 | D10 | D12 | D14 | | 4 | 2 | 4 | 3 |
| 6 | U2 | D10 | U12 | U15 | D1 | U10 | D12 | D14 | | 1 | 2 | 3 | 1 |
| 7 | U9 | D10 | U12 | U15 | D1 | D10 | U12 | D14 | | 1 | 3 | 2 | 4 |
| 8 | U1 | U10 | U12 | U14 | D1 | U10 | D12 | D14 | | 3 | 2 | 1 | 4 |
| 9 | D5 | D10 | D13 | U15 | D1 | D10 | U12 | D14 | | 3 | 1 | 4 | 2 |
| 10 | U6 | U11 | U12 | U14 | D1 | U10 | U12 | U14 | | 1 | 2 | 3 | 4 |
| 11 | D8 | U11 | D12 | D14 | D1 | U10 | U12 | D14 | | 1 | 3 | 2 | 4 |
| 12 | U3 | D11 | U12 | U14 | D1 | U10 | U12 | U14 | | 2 | 1 | 3 | 4 |
| 13 | D6 | D11 | U13 | D14 | D1 | U10 | D12 | U14 | | 3 | 4 | 1 | 2 |
| 14 | U3 | U11 | U13 | U14 | D1 | U10 | D12 | U14 | | 4 | 2 | 3 | 1 |
| 15 | U9 | D10 | U13 | U15 | D1 | U10 | D12 | D14 | | | | | |

| Time Slot | Link Schedule | | | | | | | | | | Robust Matrix Switch Schedule | | | |
|---|---|---|---|---|---|---|---|---|---|---|---|---|---|---|
| | User Link Schedule | | | | Gateway Link Schedule | | | | | Output Port for Input | | | |
| | Grp 1 | Grp 2 | Grp 3 | Grp 4 | Grp 1 | Grp 2 | Grp 3 | Grp 4 | | Input1 | Input2 | Input3 | Input4 |
| 0 | U1 | U11 | D12 | D14 | D1 | D10 | U12 | U14 | | 2 | 1 | 4 | 3 |
| 1 | U3 | U10 | D13 | U14 | D1 | D10 | U12 | D14 | | 2 | 4 | 3 | 1 |
| 2 | D9 | U10 | D13 | D14 | U1 | U10 | U12 | D14 | | 1 | 2 | 4 | 3 |
| 3 | U5 | U11 | U13 | U14 | D1 | U10 | D12 | D14 | | 4 | 2 | 3 | 1 |
| 4 | U8 | D11 | U13 | U15 | D1 | D10 | D12 | D14 | | 1 | 3 | 2 | 4 |
| 5 | D9 | U11 | U12 | U14 | U1 | U10 | D12 | D14 | | 1 | 2 | 4 | 3 |
| 6 | U2 | U10 | D12 | U15 | D1 | U10 | U12 | D14 | | 4 | 2 | 3 | 1 |
| 7 | U9 | U10 | U12 | U15 | D1 | D10 | D12 | D14 | | 1 | 3 | 2 | 4 |
| 8 | U1 | D10 | D13 | U14 | D1 | D10 | U12 | D14 | | 1 | 2 | 2 | 4 |
| 9 | D5 | D10 | U12 | U15 | D1 | U10 | U12 | U14 | | 3 | 1 | 1 | 2 |
| 10 | U6 | U11 | U12 | U15 | U1 | D10 | U12 | D14 | | 3 | 2 | 4 | 4 |
| 11 | D8 | U11 | U12 | D14 | U1 | U10 | D12 | U14 | | 1 | 3 | 3 | 3 |
| 12 | U3 | D11 | U13 | U14 | U1 | D10 | U12 | D14 | | 2 | 1 | 2 | 4 |
| 13 | D6 | D11 | U13 | D14 | D1 | U10 | D12 | U14 | | 3 | 4 | 1 | 2 |
| 14 | U3 | D11 | U13 | U14 | D1 | D10 | U12 | U14 | | 4 | 2 | 3 | 1 |
| 15 | U9 | D10 | U13 | U15 | D1 | D10 | D12 | D14 | | 4 | 2 | 3 | 1 |

ROBUST BEAM SWITCH SCHEDULING

FIELD

Embodiments relate generally to satellite communications systems, and, more particularly, to robust scheduling of beam switching patterns in satellite communications systems.

BACKGROUND

A hub-spoke satellite communications system typically includes a constellation of one or more satellites that links gateway terminals with user terminals. The gateway terminals provide an interface with a network such as the Internet or a public switched telephone network. Each gateway terminal typically services a number of user terminals located in one or more spot beams. Gateway terminals are subject to service interruptions due to weather, maintenance, disasters, etc. At such times, the affected gateway terminals may not be able to provide full capacity to the user terminals that they serve.

BRIEF SUMMARY

Among other things, systems and methods are described for robust scheduling of beam switching patterns in satellite communications systems.

BRIEF DESCRIPTION OF THE DRAWINGS

The present disclosure is described in conjunction with the appended figures:

FIG. 4 shows control and storage components used to control operation of the switching subsystems in some embodiments;

FIGS. 5A-5D show non-robust beam group switching pattern and corresponding associated illustrative systems in normal and single-gateway outage conditions, for the sake of context;

FIGS. 6A and 6B show an illustrative robust beam group switching pattern and an associated illustrative system in a normal condition;

FIGS. 6C-6E show an illustrative robust beam group switching pattern and an associated illustrative system in a condition during which the gateway terminal associated with beam group 1 is non-operational;

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In a hub-spoke satellite communications system, each of a number of gateway terminals typically services a large number of user terminals via multiple user feeds supported by multiple spot beams. When any gateway terminals experience service interruptions (e.g., due to weather, maintenance, disasters, etc.), the affected gateway terminals often cannot provide full capacity to the user terminals that they serve. In traditional implementations, where each user terminal is typically serviced by a particular one of the gateway terminals, large groups of user terminals can lose all their connectivity when their respective servicing gateway terminal goes down.

Embodiments provide novel techniques for scheduling of beam switching patterns to distribute capacity to user beams from multiple gateway terminals in a shared manner. For example, multiple gateway terminals share sourcing of capacity for any given user terminal, so that the impacts of limited gateway outages on user terminal connectivity can be reduced. The beam group switching patterns can be robustly formulated to maintain at least a minimum aggregate threshold of capacity across multiple user beams during limited gateway outages. In some implementations, beam group switching patterns are formulated to minimize worst-case degradation of capacity across user beams, to prioritize certain beams or beam groups, or to achieve other goals.

Figure 1:
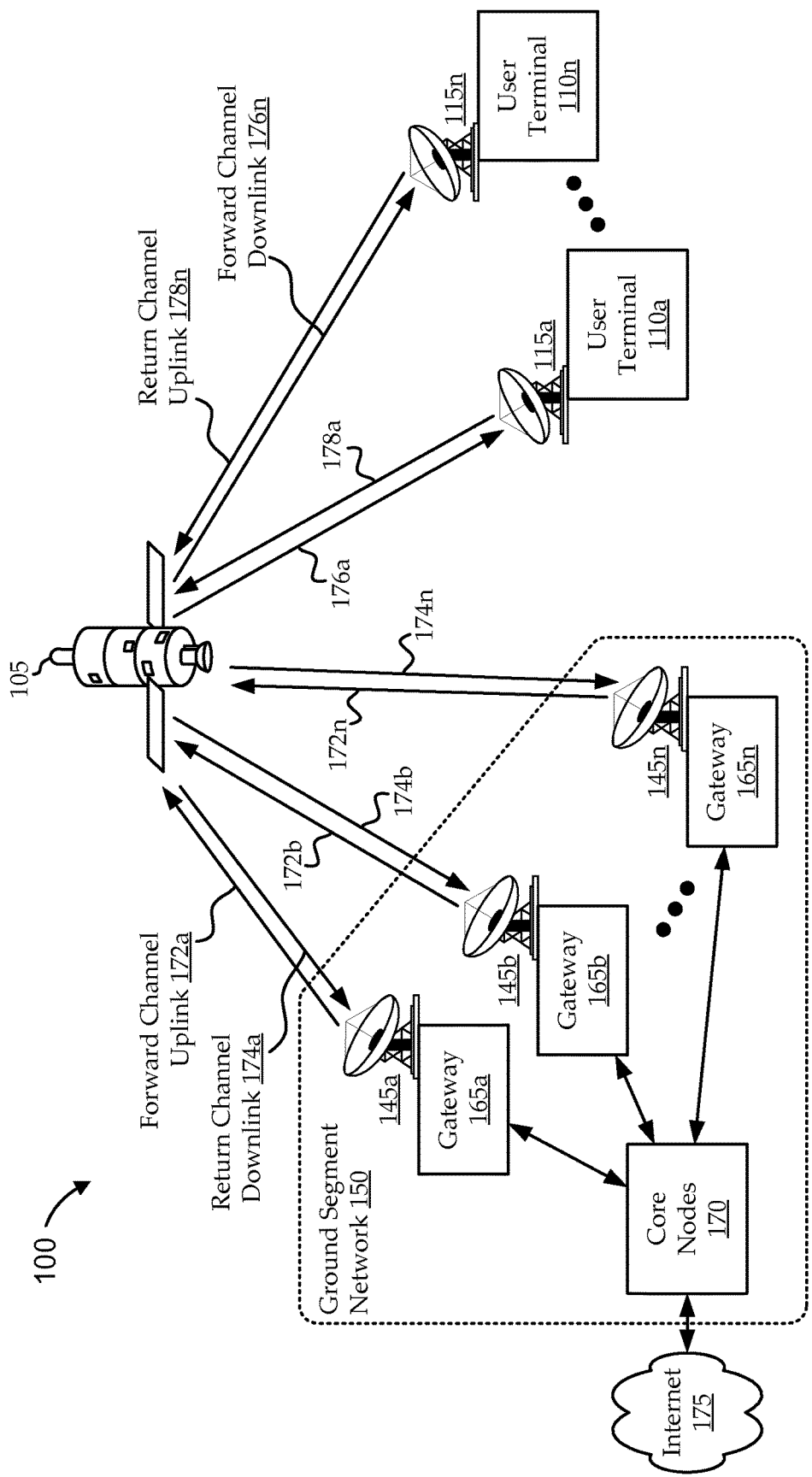
FIG. 1 shows a block diagram of an embodiment of a hub-spoke satellite communications system, according to various embodiments.

Turning first to FIG. 1, a block diagram is shown of an embodiment of a hub-spoke satellite communications system 100, according to various embodiments. The satellite communications system 100 includes a ground segment network 150 in communication with multiple user terminals 110 via a space segment (one or more satellites 105). The ground segment network 150 can include any number of gateway terminals 165, core nodes 170, network operations centers (NOCs), satellite and gateway terminal command centers, and the like. The term "ground" is used herein to generally include portions of the network not in "space." For example, embodiments of the ground terminals can include mobile aircraft terminals and the like. Further, while user terminals 110 are technically part of the ground segment of the satellite communications system 100, they are discussed separately for the sake of clarity. Though not shown, each user terminal 110 can be connected to various consumer premises equipment (CPE) such as computers, local area networks (e.g., including a hub or router), Internet appliances, wireless networks, and the like. In some implementations, user terminals 110 include fixed and mobile user terminals 110.

In a hub-spoke architecture, all communications pass through at least one gateway terminal 165. For example, a communication from a first user terminal 110 to a second user terminal can pass from the first user terminal 110 to a gateway 165 via the satellite 105, and from the gateway 165 to the second user terminal 110 via the satellite 105. Accordingly, communications can be considered as coming from a gateway terminal 165 or going to a gateway terminal 165. Communications coming from one or more gateway terminals 165 are referred to herein as "forward" or "forward-link" communications, and communications going to one or more gateway terminals (e.g., from user terminals 110) are referred to herein as "return" or "return-link" communications. Communications from the ground (e.g., gateway terminals 165 and user terminals 110) to space (e.g., the satellite 105) are referred to herein as "uplink" communications, and communications to the ground from space are referred to herein as "downlink" communications. In that parlance, the gateway terminals 165 can communicate to the satellite 105 over a forward uplink channel 172 via one or more gateway antennas 145 and can receive communications from the satellite 105 over a return downlink channel 174 via the one or more gateway antennas 145; and the user terminals 110 can communicate to the satellite 105 over a return uplink channel 178 via their user antennas 115 and can receive communications from the satellite 105 over a forward downlink channel 176 via their user antennas 115.

The gateway terminal 165 is sometimes referred to as a hub or ground station. While the gateway terminals 165 are typically in fixed locations, some implementations can include mobile gateways. The gateway terminal 165 can also schedule traffic to the user terminals 110. Alternatively, scheduling can be performed in other parts of the satellite communications system 100 (e.g., at one or more core nodes 170). Scheduling information can be communicated through a terrestrial network, a satellite command link, the communications system 100, etc. in any suitable manner. As described herein, certain scheduling information is used to robustly distribute capacity to user terminals 110 in a shared manner from multiple gateway terminals 165. Scheduling patterns and/or other information relating to this type of scheduling can be maintained and/or generated at the satellite 105, the gateway terminals 165, the core nodes 170, etc.

The ground segment network 150 can distribute ground segment functionality among various components. For example, geographically distributed core nodes 170 are in communication with the Internet 175 (and/or other public and/or private networks) and with each other via a high-speed, high-throughput, high-reliability terrestrial backbone network. The core nodes 170 have enhanced routing, queuing, scheduling, and/or other functionality. Each gateway terminal 165 is in communication with one or more core nodes 170 (e.g., redundantly). Groups of user terminals 110 are serviced by multiple gateway terminals 165 via the satellite 105 and user beams. Accordingly, return-link communications from a user terminal destined for the Internet can be communicated from the user terminal to the satellite 105 via a user beam, from the satellite 105 to multiple gateway terminals 165 via respective gateway beams, from the gateway terminals 165 to one or more core nodes 170 via the ground segment network 150, and from the one or more core nodes 170 to the Internet 175 via a backbone network. Similarly, forward-link communications to a user terminal from the Internet can arrive at a core node 170 via the backbone network, be distributed to one or more gateway terminals 165 via the ground segment network 150, and be communicated from the one or more gateway terminals to the user terminal 110 via the satellite 105.

Though illustrated as the Internet 175, the ground segment network 150 can be in communication with any suitable type of network, for example, an IP network, an intranet, a wide-area network (WAN), a local-area network (LAN), a virtual private network (VPN), a public switched telephone network (PSTN), a public land mobile network, and the like. The network can include various types of connections, like wired, wireless, optical or other types of links. The network can also connect ground segment network 150 components to each other and/or with other ground segment networks 150 (e.g., in communication with other satellites 105).

Each gateway antenna 145 and user antenna 115 can include a reflector with high directivity in the direction of the satellite 105 and low directivity in other directions. The antennas can be implemented in a variety of configurations and can include features, such as high isolation between orthogonal polarizations, high efficiency in the operational frequency bands, low noise, and the like. In one embodiment, a user antenna 115 and a user terminal 110 together comprise a very small aperture terminal (VSAT) with the antenna 115 having a suitable size and having a suitable power amplifier. In other embodiments, a variety of other types of antennas 115 are used to communicate with the satellite 105.

Each antenna is configured to communicate with the satellite 105 via a spot beam (e.g., a fixed location user beam or gateway beam). For example, each antenna points at the satellite 105 and is tuned to a particular carrier (and/or polarization, etc.). The satellite 105 can include one or more fixed-focus (e.g., gimbaled) directional antennas for reception and transmission of signals. For example, a directional antenna includes a fixed reflector with one or more feed horns for each spot beam. Typically, the satellite communications system 100 has limited frequency spectrum available for communications. The various user beams and gateway beams can use the same, overlapping, or different frequencies, polarizations, etc. In some embodiments, some or all gateway terminals 165 are located away from the user terminals 110, which can facilitate frequency re-use. In other embodiments, some user terminals 110 are located near some or all gateway terminals 165. In certain implementations, certain user terminals 110 can communicate with the satellite 105 via certain gateway beams.

Contours of a spot beam can be determined in part by the particular antenna design and can depend on factors, such as location of feed horn relative to a reflector, size of the reflector, type of feed horn, etc. Each spot beam's contour on the earth can generally have a conical shape (e.g., circular or elliptical), illuminating a spot beam coverage area for both transmit and receive operations. A spot beam can illuminate terminals that are on or above the earth surface (e.g., airborne user terminals, etc.). In some embodiments, directional antennas are used to form fixed location spot beams (or spot beams that are associated with substantially the same spot beam coverage area over time). Certain embodiments of the satellite 105 operate in a multiple spot-beam mode, receiving and transmitting a number of signals in different spot beams. Each individual spot beam can serve a gateway terminal 165, a number of user terminals 110, both a gateway terminal 165 and a number of user terminals 110, etc. Each spot beam can use a single carrier (i.e., one carrier frequency), a contiguous frequency range (i.e., one or more carrier frequencies), or a number of frequency ranges (with one or more carrier frequencies in each frequency range).

Some embodiments of the satellite 105 are non-regenerative, such that signal manipulation by the satellite 105 provides functions, such as frequency translation, polarization conversion, filtering, amplification, and the like, while omitting data demodulation and/or modulation and error correction decoding and/or encoding.

While a spot beam can refer to a particular coverage area (e.g., an elliptical are) serviced by a transponder of the satellite 105, the term "beam" as used herein generally includes a communications link or set of communications links serviced via a spot beam. For example, an "input beam" can be used by the satellite 105 to receive uplink traffic from either a user terminal 110 (return-link traffic) or a gateway terminal 165 (forward-link traffic) in a respective spot beam, and an "output beam" can be used by the satellite 105 to transmit downlink traffic to either a user terminal 110 (forward-link traffic) or a gateway terminal 165 (return-link traffic) in a respective spot beam. In some embodiments, each input beam and each output beam is serviced by a feed of the satellite 105. For example, a particular user feed is configured to receive return-channel uplink traffic from user terminals via an input beam associated with a spot beam that provides coverage to those user terminals.

Figure 2:
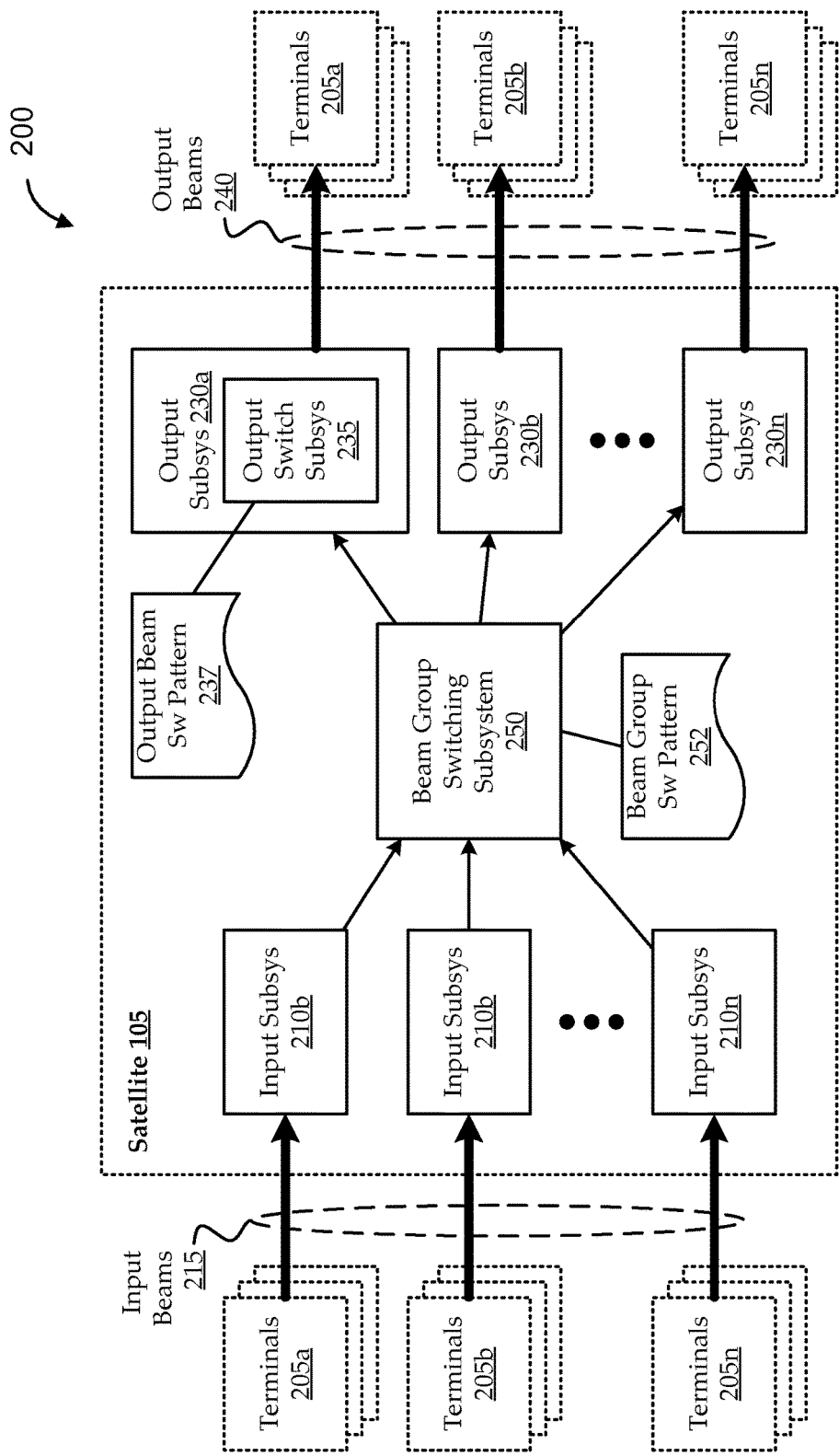
FIG. 2 shows a block diagram of an illustrative satellite communications system having gateway terminals in forward-link communication with user terminals via a satellite, according to various embodiments.

FIG. 2 shows a block diagram of an illustrative satellite communications system 200 having terminals 205 in communication with each other via a satellite 105, according to various embodiments. The satellite 105 includes input subsystems 210 and output subsystems 230 in communication via one or more beam group switching subsystems 250. Communications flow from the input subsystems 210 to the output subsystems 230 through the one or more beam group switching subsystems 250. Each input subsystem 210 is associated with one or more input beams 215 (e.g., two, nine, or some other number of beams), and each output subsystem 230 is associated with one or more output beams 240.

The terminals 205 can include gateway terminals and user terminals, and the input beams 215 and/or output beams 240 can be designated as "user beams," gateway beams," etc. In one implementation, user terminals in a particular spot beam coverage area can communicate with the satellite 105 via a user beam, and the user beam is actually a user input beam and a user output beam. For example, in a geographic region (e.g., a spot beam coverage area), the user input beams communicate at a particular uplink frequency band (e.g., 27.5-30 Gigahertz), and the user output beams communicate at a particular downlink frequency band (e.g., 17.7-20.2 Gigahertz) to avoid interference between return-channel uplink and forward-channel downlink traffic. In certain implementations, beams designated for gateway use also service users located in the same coverage area and are referred to as "gateway/user beams," or "GW/U." In some implementations, gateway terminals and/or user terminals can have multiple antennas, tuning components, and other functionality that can support communications over different beams and/or at different frequencies, polarizations, etc.

In certain implementations, different beams are associated with different transmit and/or receive powers, different carrier frequencies, different polarizations, etc. For example, a particular spot beam can have a fixed location and can support user uplink traffic, user downlink traffic, gateway uplink traffic, and gateway downlink traffic, each at different carrier/polarization combinations. In one implementation, a number of gateway terminals 165 are geographically distributed, some near user terminals 110 and some remote from user terminals 110. The satellite 105 supports a number of spot beams that together provide a large coverage area for all the user terminals 110 and gateway terminals 165. Different carrier frequencies, polarizations, and/or timing (e.g., transmit and/or receive switching, as discussed below) can be used to mitigate interference between the beams and/or to facilitate frequency reuse. Some embodiments group sets of beams (into "beam groups") that have particular characteristics. For example, a beam group can include a number of beams that are geographically distributed but operate on the same frequency bands (e.g., with the same or different respective channelizations).

According to some embodiments, each input subsystem 210 can sequentially switch among its input beams 215 (e.g., according to an input beam switching pattern) and/or each output subsystem 230 can sequentially switch among its output beams 240 (e.g., according to an output beam switching pattern). In other embodiments, some or all of the input beams are communicatively coupled with an input of the beam group switching subsystem 250 (e.g., via one or more receive components, like amplifiers, filters, etc.), and some or all of the output beams are communicatively coupled with an output of the beam group switching subsystem 250 (e.g., via one or more transmit components, like amplifiers, filters, etc.). Embodiments of the beam group switching subsystem 250 can selectively couple some or all of the input subsystems 210 with some or all of the output subsystems 230 according to a beam group switching pattern 252. In one embodiment, a switch matrix provides a full P×P non-blocking cross-connectivity (e.g., allowing P simultaneous one-to-one connections between any permutation of the P inputs and P outputs). For example, the beam group switching subsystem 250 includes a matrix switch that can sequentially couple any input subsystem 210 with any output subsystem 230 according to the beam group switching pattern 252. Using the beam group switching subsystem 250 (e.g., and input and/or output switching), forward-link traffic from multiple gateway terminals received by the satellite 105 via corresponding input beams 215 can be directed to any particular user terminal 110 via a corresponding output beam 240, and return-link traffic from any particular user terminal received by the satellite 105 via a corresponding input beam 215 can be directed to multiple gateway terminals 110 via corresponding output beams 240. In another embodiment, a switch matrix provides less than a full P×P non-blocking cross-connectivity (e.g., the switch matrix allows inputs to connect to various subsets of the outputs, or subsets of inputs to connect with subsets of outputs). In these and other ways, the capacity of each output subsystem 230 can be sourced in a shared manner by any one or more of the input subsystems 210.

In some embodiments, the beam group switching subsystem 250 sequentially couples the input subsystems 210 with the output subsystems in such a way that distributes a first aggregate capacity to the output subsystems 230 in a shared manner from P of the input subsystems 210 according to the beam group switching pattern 252 when P gateway terminals 165 associated with the P input subsystems 210 are operational. For example, the beam group switching subsystem 250 is an 8-by-8 switch matrix that can couple any of eight inputs (coupled with respective input subsystems 210) with any of eight outputs (coupled with respective output subsystems 230). The beam group switching pattern 252 is configured to distribute a first capacity (e.g., a "full capacity") from the eight input subsystems 210 in a shared manner to the eight output subsystems 230. The beam group switching pattern 252 is further configured to distribute a second capacity to the output subsystems 230 in a shared manner from fewer than eight input subsystems 210 (i.e., a remaining Q of the P input systems 210) according to the same beam group switching pattern 252 when fewer than all of the associated gateway terminals 165 are operational. For example, when one or two of the gateway terminals 165 are temporarily non-operational (e.g., due to rain fade, temporary equipment malfunction, etc.), the beam group switching pattern 252 is robust enough to maintain at least a predetermined threshold aggregate capacity for providing communications services to the user terminals 110 via the output subsystems 230.

Some embodiments are configured to switch to one or more alternative robust beam group switching patterns 252 in response to certain conditions. Typically, the robust beam group switching pattern 252 is configured to maintain adequate capacity across user beams with up to a certain extent of degradation in gateway capacity. For example, the robust beam group switching pattern 252 is designed to be a "robust two-out pattern" that maintains at least a minimum threshold amount of capacity when up to two gateway terminals 165 are non-operational. However, when any one gateway terminal 165 experiences a long-term outage (e.g., equipment malfunction, etc.), when any two gateway terminals 165 experience a long-term outage, or in any other suitable condition, an alternate robust beam group switching pattern 252 is used by the satellite 105 that is more optimized to the condition. In some implementations, the alternate robust beam group switching pattern 252 is received at the satellite 105 from a ground segment component (e.g., a gateway terminal 165) in response to detecting the long-term outage. For example, gateway terminals 165 sense fade on loopback and communicate the condition to a core node, or a gateway terminal 165 outage is otherwise detected by a core node, which has a number of pre-stored alternative robust beam group switching patterns 252. In response to the detection, the core node transmits an appropriate, new robust beam group switching pattern 252 to the satellite 105. In other implementations, the alternative robust beam group switching patterns 252 are stored at the satellite 105 and are switched in, as appropriate, upon detection of a long-term outage or similar condition. For example, the detection of the condition occurs in the ground segment, and an indication of the detection is communicated to the satellite 105.

The robustness of the beam group switching pattern 252 can be designed to facilitate certain goals. One such goal is to minimize (to a practical and/or desirable extent) worst-case (or maximum) capacity degradation across the output beams 240 of the respective beam groups of the output subsystems 230 (sometimes referred to as "min-max"). This same goal can be alternatively considered as maximizing a minimum capacity in case of limited gateway outages (e.g., the worst-case capacity for which the robust beam group switching pattern 252 is designed is as good as possible). For the sake of illustration, with P gateway terminals 165 normally sourcing capacity for the output beams 240, the goal can be for the second aggregate capacity to approximate Q/P of the first aggregate capacity when only Q of the P gateway terminals 165 are operational (e.g., seven eights of the full capacity when seven of eight gateway terminals 165 are operational). Typically, some spot beams receive less than the second capacity and others received more than the second capacity, but the goal is to approximate an aggregate capacity of Q/P across a large number of beams.

Other beam group switching patterns 252 can be designed towards a goal of prioritizing certain user terminals 110 (or spot beams, beam groups, etc.). The prioritization can be for any suitable reason, for example according to different tiers of customers (e.g., enterprise versus residential customers, etc.). In some implementations, traffic shaping and/or other techniques are used in conjunction with beam-level or beam-group-level prioritization to further prioritize traffic for user terminals 110 or groups of user terminals 110. One illustrative prioritization approach involves increasing gateway diversity for certain beams or beam groups over others. For example, F of P gateway terminals 165 are used to source capacity in a shared manner to higher priority user beams, and G of the P gateway terminals 165 are used to source capacity in a shared manner to higher priority user beams, where F is greater than G. In this way, loss of service from any one gateway terminal 165 is less likely to affect capacity of the user beams being serviced by a greater diversity of gateway terminals 165.

Another illustrative prioritization approach exploits "high reliability" gateway terminals 165. In some implementations, a portion of the gateway terminals 165 are configured to have appreciably higher reliability than the other gateway terminals 165, for example, by including in those high reliability gateway terminals 165 more capable or reliable components, more redundancy, larger antennas, etc. The beam group switching pattern 252 can be designed to source capacity to higher reliability user beams from high reliability gateway terminals 165. In one implementation, the high reliability gateway terminals 165 are grouped with the higher reliability user beams through one or more beam group switching subsystems 250, and other gateway terminals 165 are grouped with other user beams through one or more other beam group switching subsystems 250. In another implementation, the beam group switching subsystem 250 includes some high reliability gateway terminals 165 and regular gateway terminals 165, and the beam group switching pattern 252 couples the high reliability gateway terminals 165 with the higher reliability user beams more of the time (e.g., exclusively, a higher proportion of each pattern, etc.).

The satellite communications system 200 can use a framed hub-spoke, beam-switched pathway access protocol having time slots, such as a Satellite Switched Time-Division Multiple Access (SS/TDMA) scheme. As used herein, a "slot" or "time slot" refers to a smallest time division for switching according to the beam group switching pattern 252 (e.g., and input and/or output beam switching patterns). A "frame" refers to a set of slots (e.g., of predetermined length). For example, a frame can include the number of slots defined by the beam group switching pattern 252 and/or input and output beam switching patterns, so that any or all switching patterns repeat once per frame. Each time slot can correspond to either forward-link or return-link traffic from a transmitting beam to a receiving beam.

During normal operation, continuous streams of frames are typically used to facilitate communications. Multiple terminals can be serviced during each time slot using multiplexing and multiple access techniques (e.g., Time-Division Multiplexing (TDM), Time-Division Multiple Access (TDMA), Frequency-Division Multiple Access (FDMA), Multi-Frequency Time-Division Multiple Access (MF-TDMA), Code-Division Multiple Access (CDMA), and the like). For example, a forward-link time slot can be divided into multiple "sub-slots" wherein transmissions to different user terminals or groups of user terminals are made in each sub-slot. Similarly, a return-link time slot may be divided into multiple sub-slots, which can be reserved for network control or signaling information (e.g., communication of scheduling information).

Figure 3:
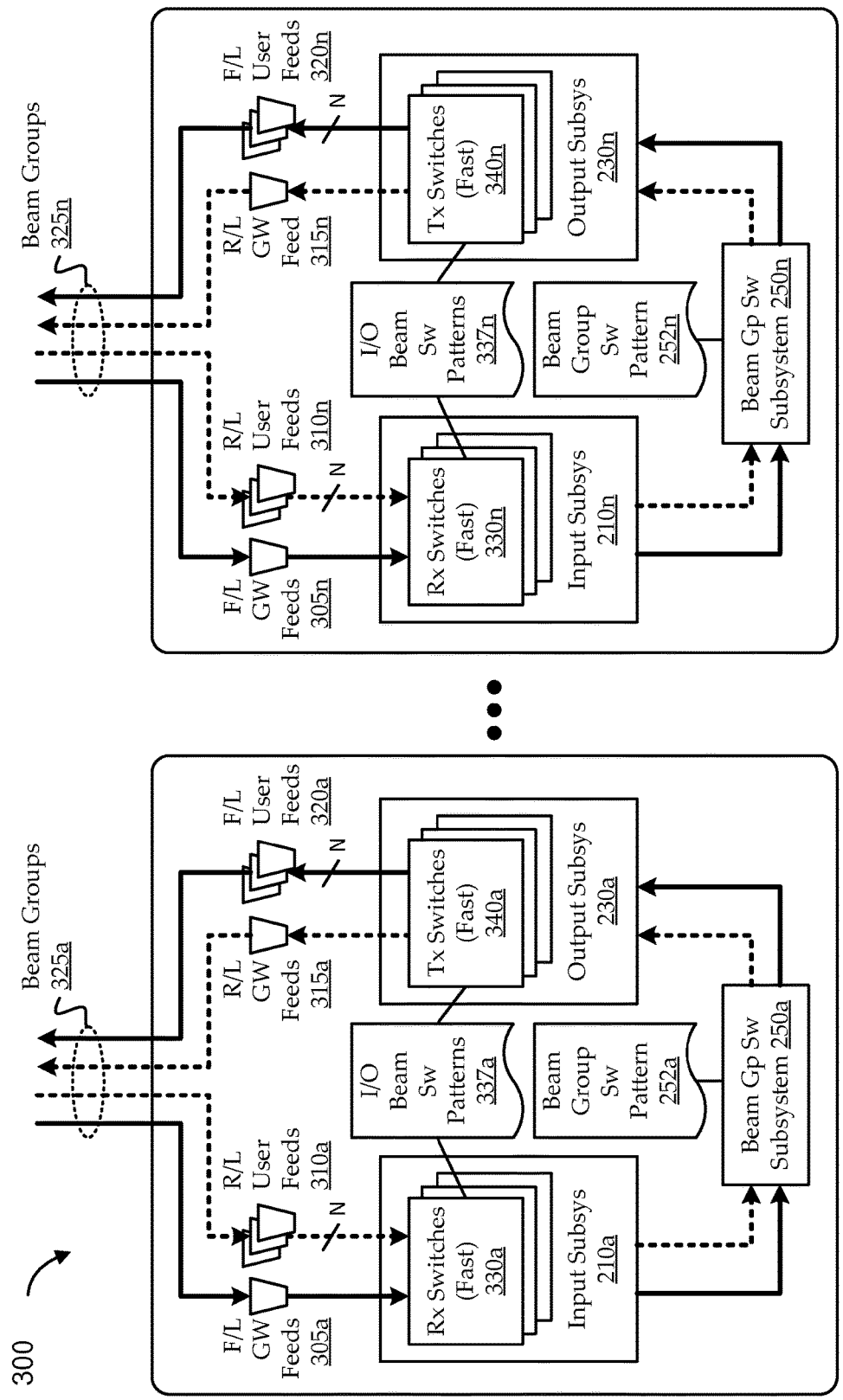
FIG. 3 shows a block diagram of an illustrative satellite configuration having multiple beam group switching subsystems associated with multiple beam groups, according to various embodiments.

FIG. 3 shows a block diagram of an illustrative satellite configuration 300 having multiple beam group switching subsystems 250 associated with multiple beam groups 325, according to various embodiments. The satellite configuration 300 can represent an embodiment of satellite 105 described herein. As in FIG. 2, each beam group switching subsystem 250 has associated input subsystems 210 and output subsystems 230. In the illustrated embodiment, each input system 210 includes one or more receive switches 330, and each output subsystem 230 includes one or more transmit switches 340 that can facilitate switching between user and/or gateway feeds as described below. Designations, like "user beam," "user feed," "gateway beam," or "gateway feed" are included for added clarity, but are not intended to be limiting. For example, some implementations allow user terminals 110 to communicate over gateway beams, and the corresponding beams and feeds are designated generally as a "GW" "GW/U." In some embodiments, some or all of the input subsystems 210 are implemented without receive switches 330 and/or some or all of the output subsystems 230 are implemented without transmit switches 340. In certain implementations, each feed is coupled with an input or output port of a beam group switching subsystem 250, so that the beam group switching subsystem 250 can effectively couple input feeds with output feeds without additional beam switching.

Though not shown, the input systems 210 and/or output subsystems 230 can also include any other supporting functionality, including, for example, amplifiers, converters, filters, etc. In one implementation, each input subsystem 210 includes a low-noise amplifier (LNA), and each output subsystem 230 includes a high-power amplifier (HPA) (e.g., a traveling wave tube amplifier (TWTA)). In some embodiments, the receive switches 330 and/or transmit switches 340 are implemented as "fast" switches (e.g., capable of switching rapidly relative to frames). Implementations of the switches operate at radio frequency (RF) such as Ka band frequencies. In some embodiments, ferrite switches are used for the switches, which can provide fast switching, low insertion loss (e.g., do not substantially impact equivalent isotropically radiated power (EIRP) or gain-to-noise-temperature (G/T)), high power handling capabilities, etc.

The illustrated configuration includes multiple levels of terminal grouping. At a first level, user terminals 110 and/or gateway terminals 165 communicate over input and output beams corresponding to feeds. For example, each "user feed" 310/320 supports communications for a number of user terminals 110. At a second level, the input and output beams (and respective feeds) can be grouped into spot beams. For example, each spot beam can support multiple feeds at different frequencies (e.g., separate uplink and downlink frequencies) and/or polarizations. At a third level, beams can be grouped into beam groups. For example, as described above, each input subsystem 210 and/or output subsystem 230 can have respective receive switches 330 and/or transmit switches 340 that can switch between beams in an associated beam group (e.g., according to input/output (I/O) beam switching patterns 337). At a fourth level, beam groups can themselves be grouped by associated beam group switching subsystems 250 (e.g., into "sets of beam groups" or "matrix switch groups"). For example, as illustrated in FIG. 2, each beam group switching subsystem 250 can selectively couple up to P input subsystems 210 with up to P output subsystems 230, so that each beam group switching subsystem 250 effectively facilitates communications with up to P beam groups (assuming the same P beam groups are associated with the input subsystems 210 (for receive traffic) and the output subsystems 230 (for transmit traffic)). Further, as illustrated in FIG. 3, a single satellite 105 (or group of associated satellites 105) can have multiple beam group switching subsystems 250, each associated with its own set of beam groups 325 (e.g., its own P beam groups supported by its own P input and/or output subsystems). Accordingly, n beam group switching subsystems 250 can support n sets of beam groups 325a-325n. Some of these groupings are not explicitly illustrated for the sake of clarity. For example, while forward-link gateway feed 305a is illustrated by a single arrow, the forward-link gateway feed 305a can represent (for a given communication) a particular feed of a particular beam of a particular beam group of a particular set of beam groups 325 serviced by one of the particular input subsystems 210a of a particular beam group switching subsystem 250a.

For the sake of clarity, forward pathways (e.g., for forward-link communications) are illustrated by solid arrows, and return pathways (e.g., for return-link communications) are illustrated by dashed arrows. For example, a forward-channel uplink signal is received via a forward-link gateway feed 305a at a first of the input subsystems 210a of a first beam group switching subsystem 250a (e.g., a receive switch 330 associated with the input subsystem 210a is switched to receive from the forward-link gateway feed 305a according to the I/O beam switching pattern 337 corresponding to the present slot). The traffic from the forward-channel uplink signal is routed to a particular one of the output subsystems 230a of the beam group switching subsystem 250a according to the beam group switching pattern 252 corresponding to the present slot. The signal (now a forward channel downlink signal) is routed to one of N forward-link user feeds 320a corresponding to one of the beams of the beam group associated with the particular one of the output subsystems 230a (e.g., a transmit switch 340 associated with the particular output subsystem 230a is switched to transmit over the forward-link user feed 320a according to the I/O beam switching pattern 337 corresponding to the present slot).

Similarly, at a next slot, a return-channel uplink signal is received via a return-link user feed 310a at a first of the input subsystems 210a of a first beam group switching subsystem 250a (e.g., the receive switch 330 associated with the input subsystem 210a is switched to receive from the return-link user feed 310a according to the I/O beam switching pattern 337 corresponding to the next slot). The traffic from the return-channel uplink signal is routed to a particular one of the output subsystems 230a of the beam group switching subsystem 250a according to the beam group switching pattern 252 corresponding to the next slot. The signal (now a return-channel downlink signal) is routed to one of N return-link gateway feeds 315a corresponding to one of the beams of the beam group associated with the particular one of the output subsystems 230a (e.g., a transmit switch 340 associated with the particular output subsystem 230a is switched to transmit over the return-link gateway feed 315a according to the I/O beam switching pattern 337 corresponding to the next slot).

Typically, each of the I/O beam switching pattern 337 and the beam group switching pattern 252 defines a certain configuration at each slot of each frame, and the slot boundaries of the switching patterns are synchronized (e.g., lined up). For example, the I/O beam switching pattern 337 repeats for each of a number of first frames, each having N slots, and the beam group switching pattern 253 repeats for each of a number of second frames, each having M slots. The I/O beam switching pattern 337 can define which input and output beams of its respective beam groups to use for communications during each of the N slots of its frame. The beam group switching pattern 252 can define which input subsystems 110 to communicatively couple with each output subsystem 230 during each of the M slots of its frame. In some implementations, N and M are equal, so that the I/O beam switching pattern 337 and the beam group switching pattern 252 repeat at the same time interval. In other implementations, the frame lengths are different, so that the beam group switching pattern 252 repeats more or less often than the I/O beam switching pattern 337. For example, the I/O beam switching pattern 337 has 64 slots, and the beam group switching pattern 252 has 128 slots (i.e., the beam group switching pattern 252 repeats half as often as the I/O beam switching pattern 337).

Further, the switching patterns do not necessarily change configuration at each slot of each frame. For example, the I/O beam switching pattern 337 can change which input and output beams of its respective output beam group to use for receiving and transmitting once per each R slots, and the beam group switching pattern can change which input subsystem 210 to communicatively couple with each output subsystem 230 once per each S slots. In some implementations, R and S are both one, so that each switching pattern changes its respective configuration substantially at each slot boundary. In other implementations, R and S are different, so that each switching pattern changes its respective configuration at different rates. Further, R and S are not necessarily consistent throughout a frame. For example, the beam group switching pattern 252 can change its configuration at every slot during some portions of the frame, and can change its configuration less often during other portions of the frame.

In some implementations, sets of frames can be grouped into "super-frames." For example, as described below, some implementations include a robust beam group switching pattern 252 that repeats at each frame and does not change over time (e.g., unless certain, relatively unlikely conditions occur). Other implementations can include a set of multiple robust beam group switching patterns 252, where each repeats at each frame for some amount of time, and the set of robust beam group switching patterns 252 repeats over a longer period of time defined by a super-frame. For example, a number of time windows is defined to coincide with peak usage times in different time zones. Each time window is associated with a corresponding robust beam group switching pattern 252 that is optimized for load balancing in context of the peak-usage beams, but the robust beam group switching pattern 252 does not change during its corresponding time window (e.g., absent long-term gateway outages or other such unlikely conditions).

While certain functionality is described in context of the satellite 105 (e.g., satellite configuration 300), some of the functionality involves coordination between the satellite 105 and one or more gateway terminals 165, core nodes 170, and/or other ground systems. For example, sourcing forward-link capacity for a given user beam from multiple gateway terminals 165 in a shared manner can involve queuing traffic destined for user terminals 110 of that user beam and distributing the queued traffic across the multiple gateway terminals 165 in a manner that supports the shared distribution. Similarly, sinking return-link capacity for a given user beam by multiple gateway terminals 165 in a shared manner can involve scheduling traffic from user terminals 110 of that user beam to be received via multiple gateway terminals 165 in a manner that supports the shared distribution. This can be effectuated by distributing and/or scheduling the traffic with respect to gateway terminals 165 with an awareness of applicable I/O beam switching patterns 337 and beam group switching patterns 252. In some embodiments, the gateway terminals 165 are aware of the appropriate switching patterns themselves or in conjunction with a gateway controller or other system. In other embodiments, the gateway terminals 165 are unaware of the appropriate switching patterns, but core nodes in communication with the gateway terminals 165 are aware of the switching patterns and can deliver traffic to the gateway terminals 165 as appropriate.

The embodiments illustrated in FIGS. 2 and 3 show only certain implementations of satellite functionality described herein. Different numbers and/or types of components can be used in the same or other configurations to provide similar or identical functionality without departing from the scope of embodiments. For example, as illustrated in FIG. 4, control and storage components can be used to control operation of the switching subsystems in some embodiments. A switch pattern store 420 can be used to store I/O beam switching patterns 337 and beam group switching patterns 252. These patterns can be provided, as appropriate, to a switch controller 410. The switch controller 410 can be used to control (e.g., direct, synchronize, etc.) switching of receive switches 330, transmit switches 340, and/or beam group switching subsystems 250, etc. In other embodiments the switch controller 410 includes one or more switch controllers 410 and/or the switch pattern store 420 includes one or more switch pattern stores 420.

Certain features of robust beam group switching functionality are illustrated using the sample switching patterns shown in FIGS. 5A-6E. Turning first to FIGS. 5A-5D, a non-robust beam group switching pattern is illustrated in normal and single-gateway outage conditions, for the sake of context. The beam group switching pattern can be associated with a beam group switching subsystem associated with four beam groups (illustrated as "Grp 1"-"Grp 4") and four associated gateway terminals 165. The "user link schedule" and the "gateway link schedule" are governed by an illustrative I/O switching pattern 337 (e.g., effectuated by receive switches 330 and transmit switches 340). For example, at time slot 0, the receive and transmit switches for four respective input and output subsystems are configured so that beam group 1 is set for user uplink and gateway downlink both on beam 1, beam group 2 is set for user uplink on beam 11 and gateway downlink on beam 10, beam group 3 is set for user downlink on beam 12 and gateway uplink on beam 12, and beam group 4 is set for user downlink on beam 14 and gateway uplink on beam 14. These designations are described more fully below.

Figure 5B:
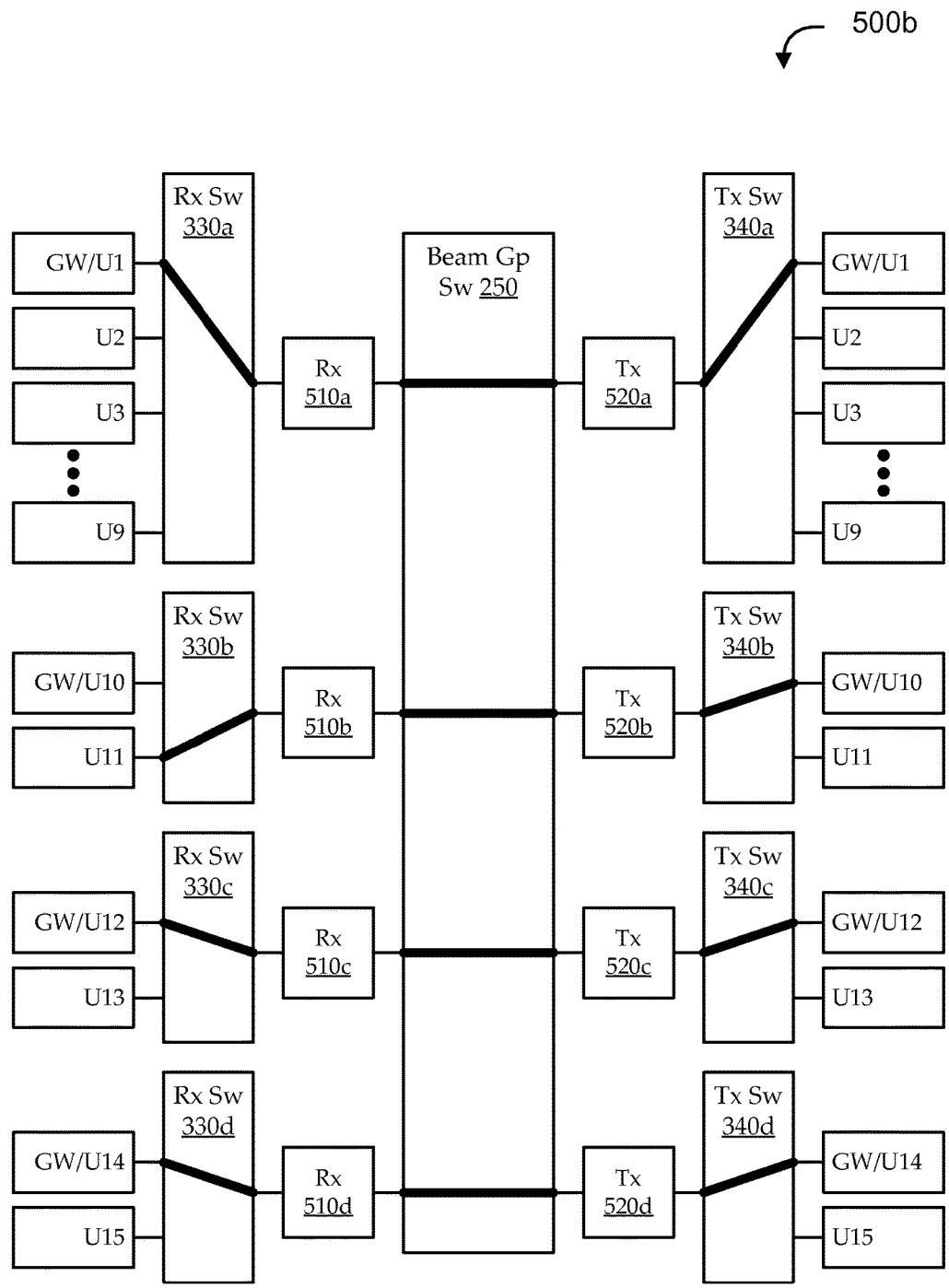

FIG. 5B shows a functional block diagram corresponding to an illustrative system 500b in a configuration like the one described for time slot 0 of FIG. 5A. As illustrated, the system 500b includes four receive switches 330 and four transmit switches 340, coupled with a 4-by-4 beam group switching subsystem 250 via respective receive components 510 and transmit components 520 (e.g., appropriate amplifiers, filters, etc.). For example, the receive components 510 and transmit components 520 include components of the input subsystems 210 and output subsystems 230 described above, respectively.

The first beam group serviced by the first receive switch 330a has nine beams, including eight user beams and one gateway/user beam ("GW/U") (e.g., usable by an associated gateway terminal 165 and user terminals 110 in the beam's coverage area), and each of the other three groups serviced by respective receive switches 330b-330d has two beams, including one user beam and one gateway/user beam. For example, any of beams 1-9 can be used to service user terminals 110 in Grp 1, while the gateway terminal 165 of Grp 1 is serviced using only beam 1. Also, as illustrated, each beam can support an uplink feed and a downlink feed. For example, the "GW/U 1" feed shown as an input to the first receive switch 330a services return-channel uplink traffic for the user terminals 165 of Grp 1 (designated as "U1" in the user link schedule of FIG. 5A) or forward-channel uplink traffic for the gateway terminal 165 of Grp 1 (designated as "U1" in the gateway link schedule of FIG. 5A). Similarly, the "GW/U 1" feed shown as an output to the first transmit switch 340a services forward-channel downlink traffic for the user terminals 165 of Grp 1 (designated as "D1" in the user link schedule of FIG. 5A) or return-channel downlink traffic for the gateway terminal 165 of Grp 1 (designated as "D1" in the gateway link schedule of FIG. 5A). It is noted that the "U" designation in FIG. 5A refers to "uplink" (e.g., for user terminals in return-channel communication or for gateway terminals in forward-channel communication) while the "U" designation in FIG. 5B refers to "user" (e.g., a beam designated for use by user terminals, not by gateway terminals).

The "matrix switch schedule" of FIG. 5A is governed by an illustrative beam group switching pattern 252 (e.g., effectuated by the beam group switching subsystem 250 of FIG. 5B). The white cells with black text indicate return-link configurations, and the black cells with white text indicate forward-link configurations. In the non-robust pattern examples shown in FIGS. 5A-5D, the matrix switch schedule is configured simply for pass-through. In every time slot, the input subsystem 210 associated with beam group N is coupled with the output subsystem 230 associated with beam group N. As illustrated in FIG. 5B, receive switches 330a-330d are coupled via the beam group switching subsystem 250 with transmit switches 340a-340d, respectively.

For example, the gateway terminal 165 associated with beam 1 of beam group 1 ("GW/U 1" in FIG. 5B) services the capacity for all the user terminals 110 in beam group 1 for all time slots. As shown in FIG. 5A for time slot 0, the first receive switch 330a and the first transmit switch 340a are coupled through the beam group switching subsystem 250 to form a return-channel pathway. As illustrated in FIG. 5B, the pathway effectively passes traffic received on the "GW/U 1" return-channel user uplink feed ("U1" on the User Schedule of FIG. 5A) to the "GW/U 1" return-channel gateway downlink feed ("D1" on the Gateway Schedule of FIG. 5A).

Figure 5D:
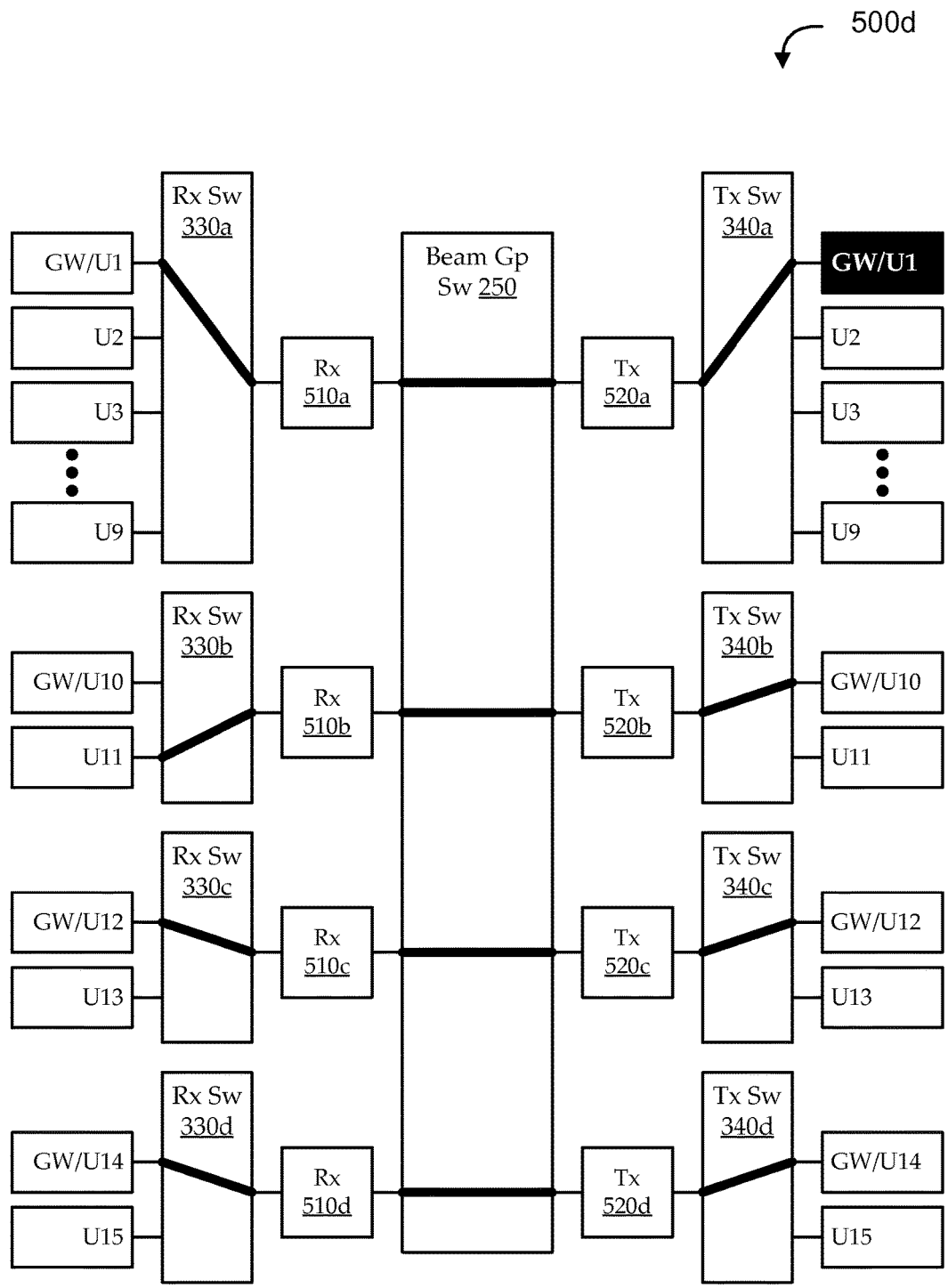

In the normal condition, all four gateway terminals 165 are operational, and the gateways can support full capacity. In this pass-through configuration, however, any user terminals 110 being serviced by a particular gateway terminal 165 can lose all capacity for the duration of the gateway outage (or until a new switch configuration can be established. For example, FIG. 5C illustrates a condition during which the gateway terminal 165 associated with beam group 1 is non-operational. As shown by the shaded cells, no communications are supported on any beams in beam group 1 for the entire duration of the outage. This condition is also illustrated in FIG. 5D for time slot 0. The "GW/U 1" return-channel gateway downlink feed is shown as black with white text to indicate that the gateway terminal 165 associated with that downlink feed is non-operational. With a non-operational gateway terminal 165 in the path, traffic cannot be communicated via that feed. Similarly, in any time slots having the first receive switch 330a set to select its "GW/U 1" feed, the first beam group would be attempting to receive forward-channel uplink traffic from the non-operational gateway terminal.

Figure 6B:
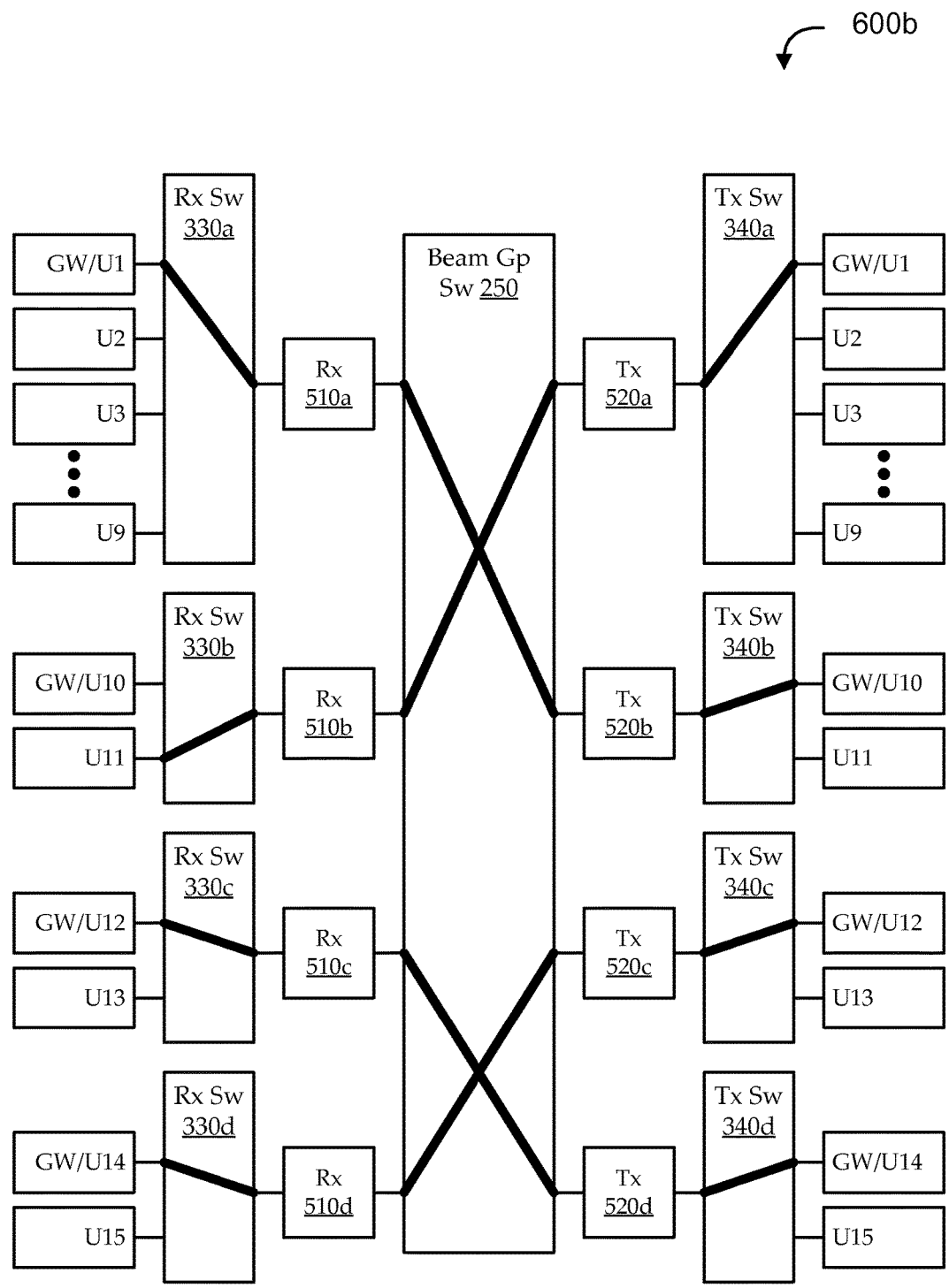

FIGS. 6A-6E show illustrative robust switching patterns and an illustrative system embodiment governed by those switching patterns, all corresponding to the non-robust cases described in FIGS. 5A-5D, respectively. Turning to FIG. 6A, an illustrative robust beam group switching pattern is shown in a normal condition. The robust beam group switching pattern is associated with a beam group switching subsystem 250 associated with four beam groups (illustrated as "Grp 1"-"Grp 4") and four associated gateway terminals 165. To facilitate comparison, the "user link schedule" and the "gateway link schedule" are governed by the same illustrative I/O switching pattern 337 described with respect to FIGS. 5A-5D. Further, as in FIGS. 5A-5D, the first beam group has nine beams, including eight user beams and one gateway/user beam (e.g., usable by an associated gateway terminal 165 and user terminals 110 in the beam's coverage area), and each of the other three groups has two beams, including one user beam and one gateway/user beam. Unlike the non-robust (e.g., pass-through) matrix switch configuration in FIGS. 5A-5D, FIG. 6A shows a more robust matrix switch schedule that changes which input beam group is coupled with which output beam group in each time slot.

The "matrix switch schedule" is governed by an illustrative robust beam group switching pattern 252 (e.g., effectuated by a beam group switching subsystem 250). The white cells with black text indicate return-link configurations, and the black cells with white text indicate forward-link configurations. For the sake of illustration, in time slot 0, the input portion of beam group 1 (i.e., the "U" designation in "Grp 1") is designated as "U1" in the User Link Schedule, indicating that the receive switch 330 of the input subsystem 210 for beam group 1 is switched to receive a return-channel user uplink feed on beam 1. The matrix switch schedule indicates that, in time slot 0, Input 1 (corresponding to the input subsystem 210 of the first beam group) is coupled with Output 2 (corresponding to the output subsystem 210 of the second beam group). The output portion of beam group 2 (i.e., the "D" designation in "Grp 2") is designated as "D10" in the Gateway Link Schedule, indicating that the transmit switch 330 of the output subsystem 230 for beam group 2 is switched to transmit a return-channel gateway downlink feed on beam 10.

FIG. 6B shows a functional block diagram corresponding to an illustrative system 600b in a configuration like the one described for time slot 0 of FIG. 6A. For the sake of comparison, the system 600b of FIG. 6B is essentially identical to the system 500b of FIG. 500b, except that the beam group switching subsystem 250 is not configured as a pass-through. As illustrated, according to time slot 0 of the matrix switch schedule, the first receive switch 330a is coupled with the second transmit switch 340b (via respective receive components 510a and transmit components 520b and the beam group switching subsystem 250); the second receive switch 330b is coupled with the first transmit switch 340a; the third receive switch 330c is coupled with the fourth transmit switch 340d; and the fourth receive switch 330d is coupled with the third transmit switch 340c. For example, a return-channel pathway is effectively formed between the gateway terminal of Grp 1 and user terminals on beam 11. The "U 11" return-channel user uplink feed ("U11" on the User Schedule of FIG. 6A) passes return-channel traffic in time slot 0 to the "GW/U 1" return-channel gateway downlink feed ("D1" on the Gateway Schedule of FIG. 6A), via the second receive switch 330b, the second receive components 510b, the beam group switching subsystem 250, the first transmit components 520a, and the first transmit switch 340a. Effectively, during the illustrated time slot, the gateway terminal of Grp 1 (on beam 1) is servicing return-channel traffic for user terminals in Grp 2 (on beam 11), the gateway terminal of Grp 2 (on beam 10) is servicing return-channel traffic for user terminals in Grp 1 (on beam 1), the gateway terminal of Grp 3 (on beam 12) is servicing forward-channel traffic for user terminals in Grp 4 (on beam 14), and the gateway terminal of Grp 4 (on beam 14) is servicing forward-channel traffic for user terminals in Grp 3 (on beam 12).

Comparing time slot 0 with time slot 8 in FIG. 6A, the user link and gateway link schedules for Grp 1 are the same, but the matrix switch schedules are different. Again, the input portion of beam group 1 is designated as "U1" in the User Link Schedule, indicating a return-channel user uplink feed on beam 1. However, the matrix switch schedule indicates that, in time slot 8, Input 1 is coupled with Output 1. The link schedules indicate that the output portion of beam group 1 is designated as "D1" in the Gateway Link Schedule, indicating a return-channel gateway downlink feed on beam 1. Accordingly, over the course of the sixteen illustrative time slots, beam 1 is used twice for return-channel user uplink traffic; but the downlink handling of the return-channel traffic on beam 1 is shared between first and second gateway terminals 165.

One forward-link example is illustrated by the downlink traffic on beam 13. The link schedules indicate that the output portion of beam group 3 shows "D13" (indicating that the transmit switch 330 of the output subsystem 230 for beam group 3 is switched to transmit a forward-channel user downlink feed on beam 13) for time slots 1, 2, 3, and 9. According to the matrix switch schedule for those time slots, the input subsystem 230 of beam group 3 is coupled with the output subsystems 210 of beam groups 3, 4, 3, and 1, respectively. As such, over the course of the sixteen illustrative time slots, beam 13 is being used for forward-channel downlink traffic during four time slots (i.e., 25% of the time), and its forward-link capacity is being sourced over those four time slots by three different gateway terminals 165 (i.e., half by the gateway terminal 165 of beam group 3, and a quarter each by the gateway terminals 165 of beam groups 1 and 4).

In the illustrated normal condition, all four gateway terminals 165 are operational, and the gateways can support full capacity. Because the user links are being serviced in a shared manner by multiple gateway terminals 165, gateway outages can occur without completely eliminating capacity to all the user feeds in a particular group. For example, FIG. 6C illustrates a condition during which the gateway terminal 165 associated with beam group 1 is non-operational. The shaded cells indicate effects of an outage condition regarding the gateway terminal 165 of beam group 1 ("Gateway 1"). For example, the entire column corresponding to the link schedule for Gateway 1 is shaded to indicate that Gateway 1 cannot support any traffic during its outage. The values in the shaded cells are still present to indicate that the embodiment of the switches will continue to try to switch Gateway 1 into the configuration according to the switch patterns, even though it is non-functional.

Figure 6D:
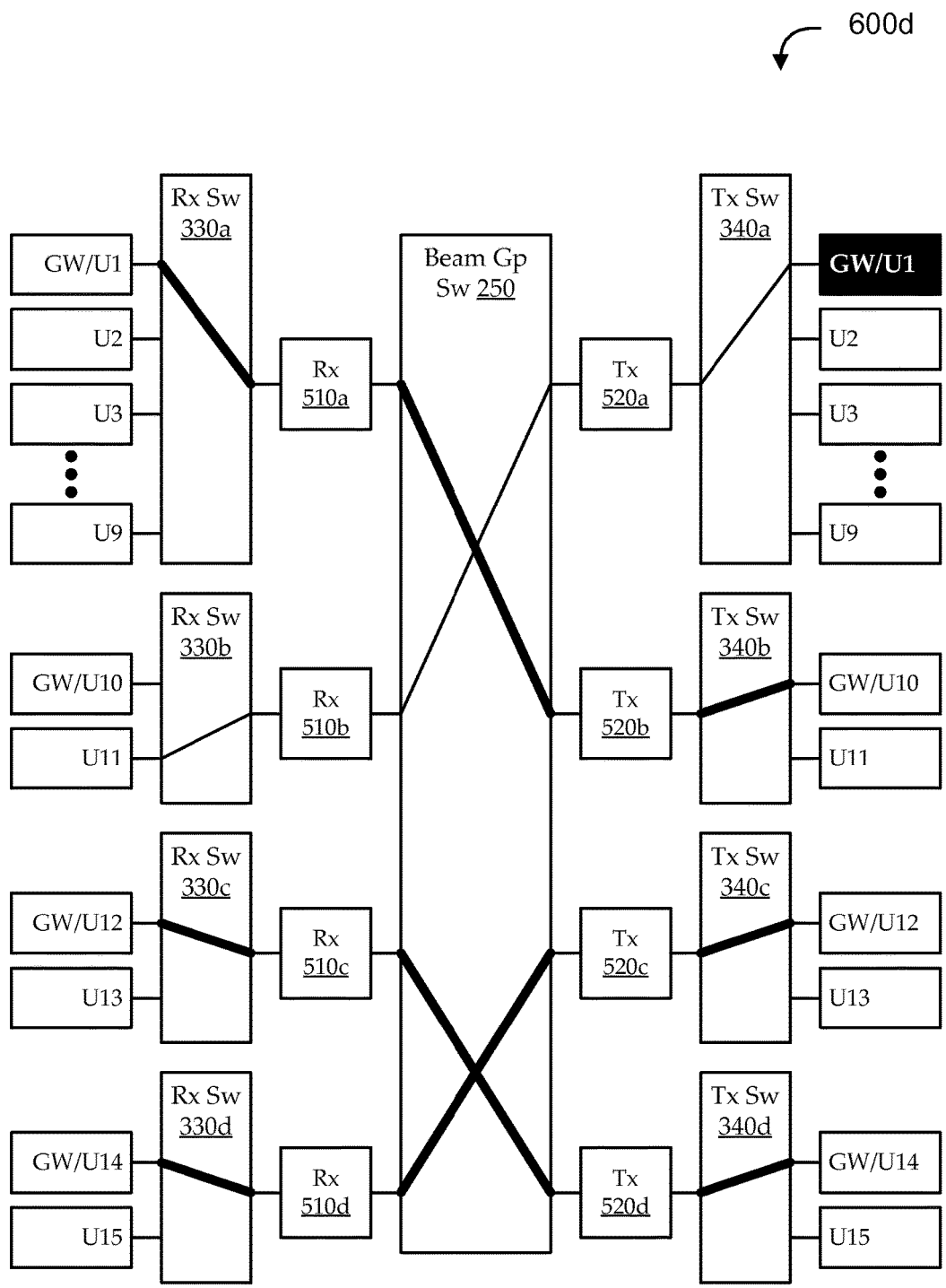
Figure 6E:
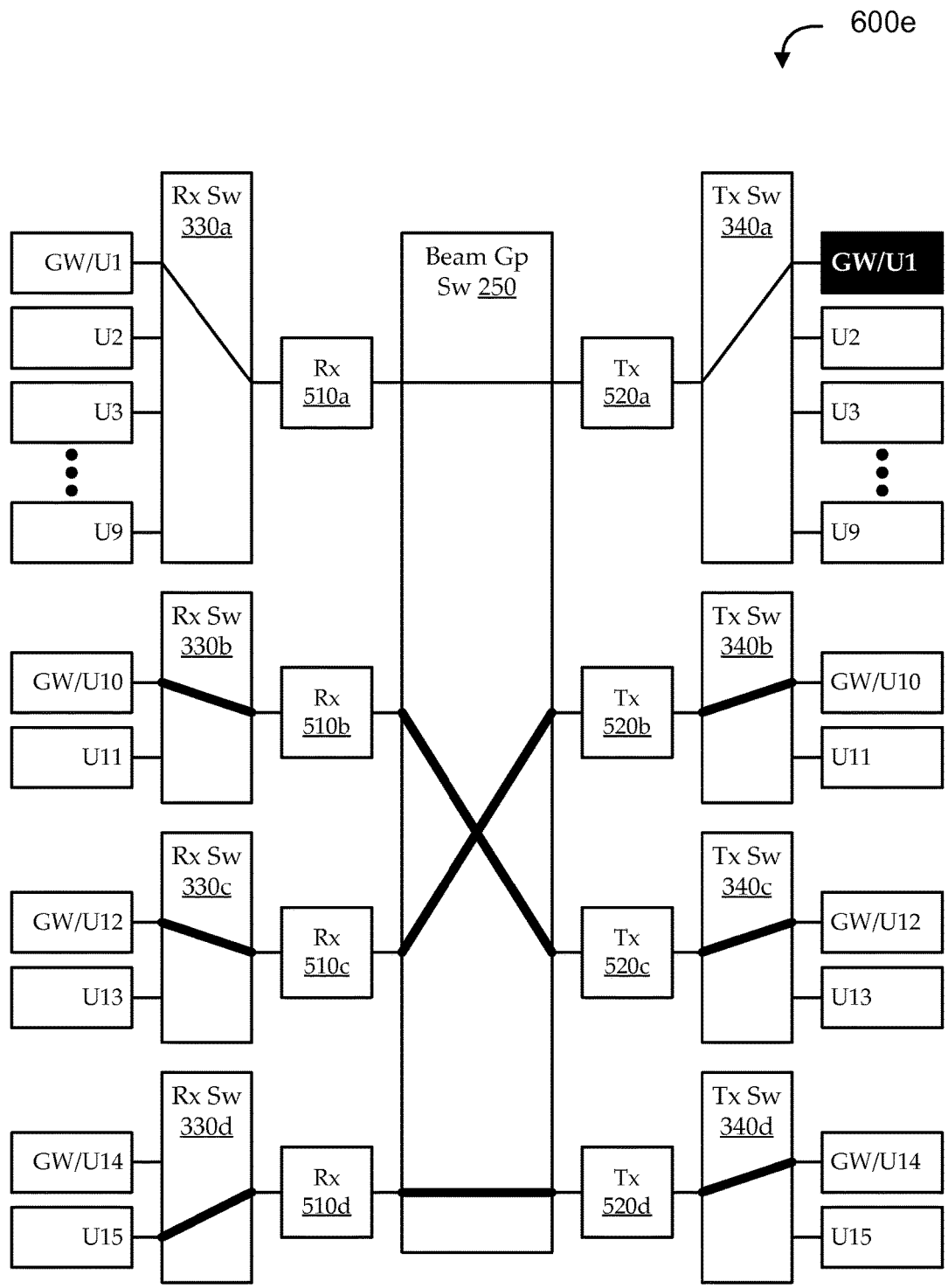

The examples described in context of FIG. 6A can be shown with reference to FIG. 6C to illustrate features of robust switching patterns. In the return-link example, beam 1 is being used for return-channel user uplink traffic during 2 of the 16 time slots (⅛ of the time), and is serviced half by Gateway 1 and half by Gateway 2 (i.e., each for one of the two time slots). With the outage of Gateway 1, the return link capacity on beam one cannot be serviced during time slot 8 of each frame, but it can still be serviced during time slot 0 of each frame. Accordingly, the return-link capacity for beam 1 is degraded by approximately one half The outage cases of time slots 0 and 8 are shown in FIGS. 6D and 6E, respectively. Comparing the no-outage case of FIG. 6B to the outage case of FIG. 6D, the outage of Gateway 1 impacts its ability in time slot 0 to sink return-channel traffic from user terminals in beam 11 (Grp 2 users). However, the outage has no impact during time slot 0 on return-channel traffic for users in beam 1 (Grp 1 users), as those users are being serviced by Gateway 2 via beam 10 during that time slot. In time slot 8, different gateway terminals are servicing different beams. For example, return-channel traffic for the users in beam 1 cannot be supported during time slot 8 due to the outage of Gateway 1. Comparing FIGS. 6D and 6E, the robust switching pattern allows users in beam 1 to keep some return-channel capacity even in the face of a Gateway 1 outage.

Returning to FIG. 6C, in an illustrative forward-link example, beam 13 is being used for forward-channel user downlink traffic during 4 of the 16 time slots (¼ of the time), and is serviced one quarter of the time by Gateway 1, half the time by Gateway 3, and the remaining quarter of the time by Gateway 4 (i.e., 1, 2, and 1 slots each, respectively). With the outage of Gateway 1, the return link capacity on beam one cannot be serviced during time slot 9 of each frame, but it can still be serviced during time slots 1, 2, and 3 of each frame. Accordingly, the forward-link capacity for beam 13 is degraded by approximately one-quarter. Similarly, an outage of Gateway 2 would have no effect on forward-link capacity for beam 13, an outage of Gateway 3 would degrade the forward-link capacity for beam 13 by approximately one-half, and an outage of Gateway 4 would degrade the forward-link capacity for beam 13 by approximately one-quarter. Indeed, Gateways 1, 3, and 4 would all have to be non-operational at the same time to bring the forward-link capacity for beam 13 down to zero.

Figure 7A:
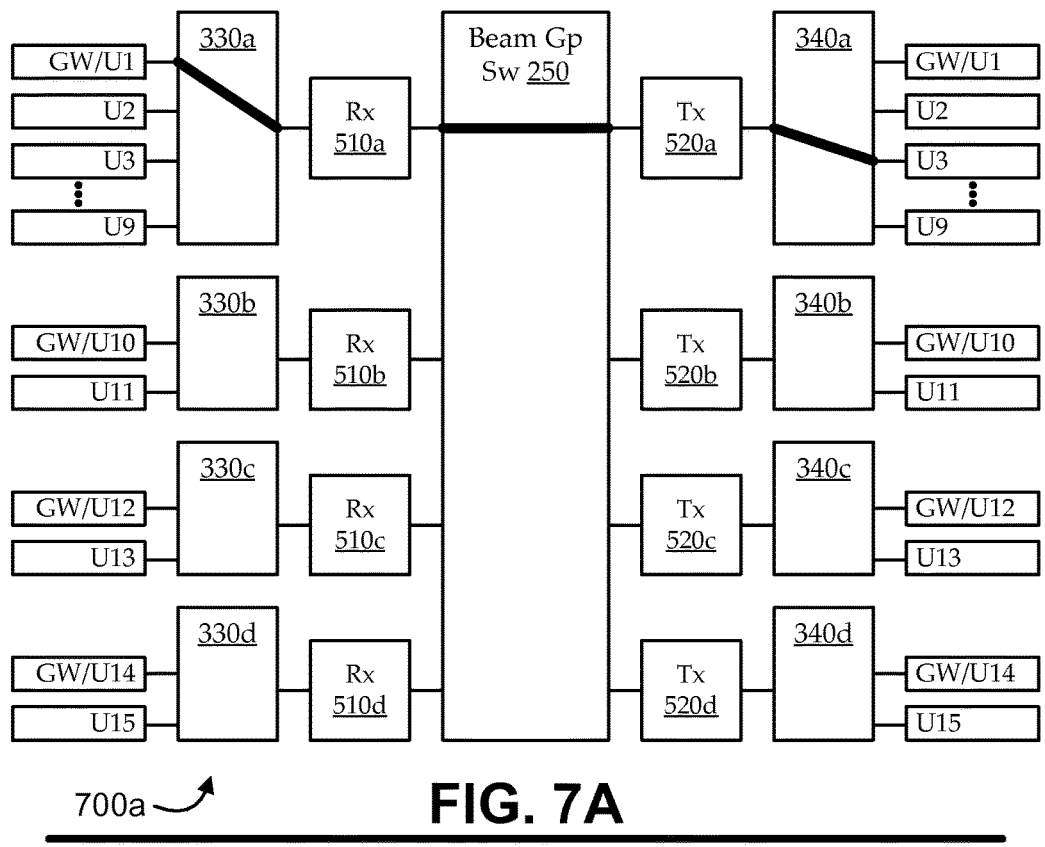
FIGS. 7A-7D show four configurations of an illustrative system for sourcing forward-link capacity to a user beam in a shared manner among four gateway terminals.
Figure 7B:
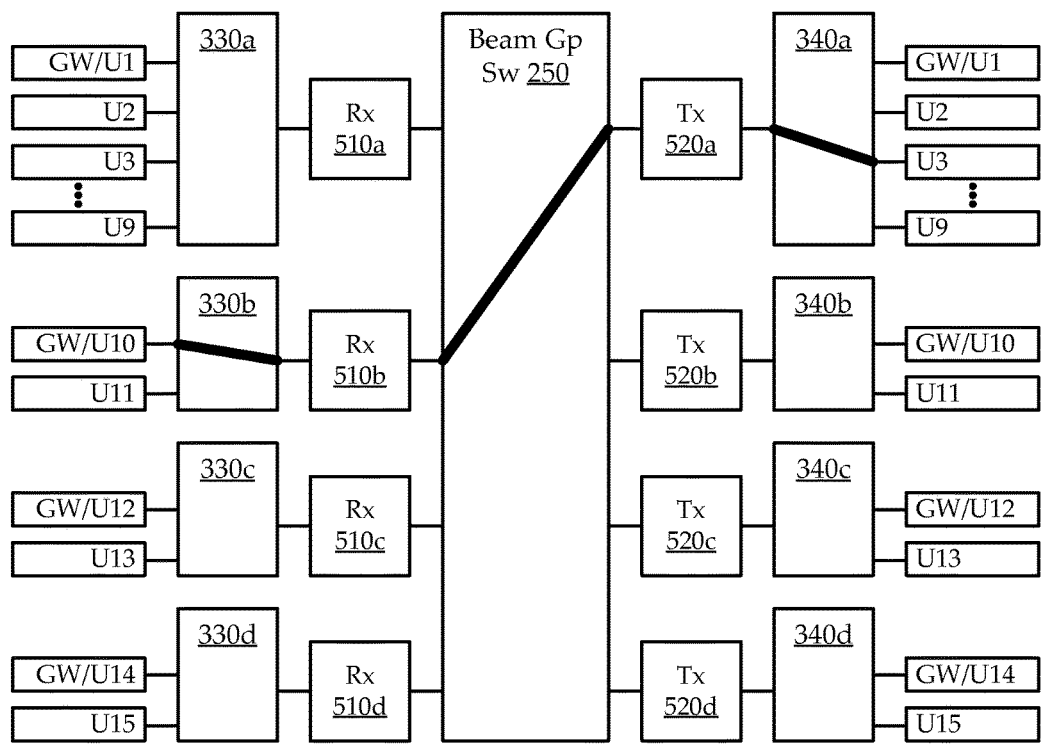
Figure 7C:
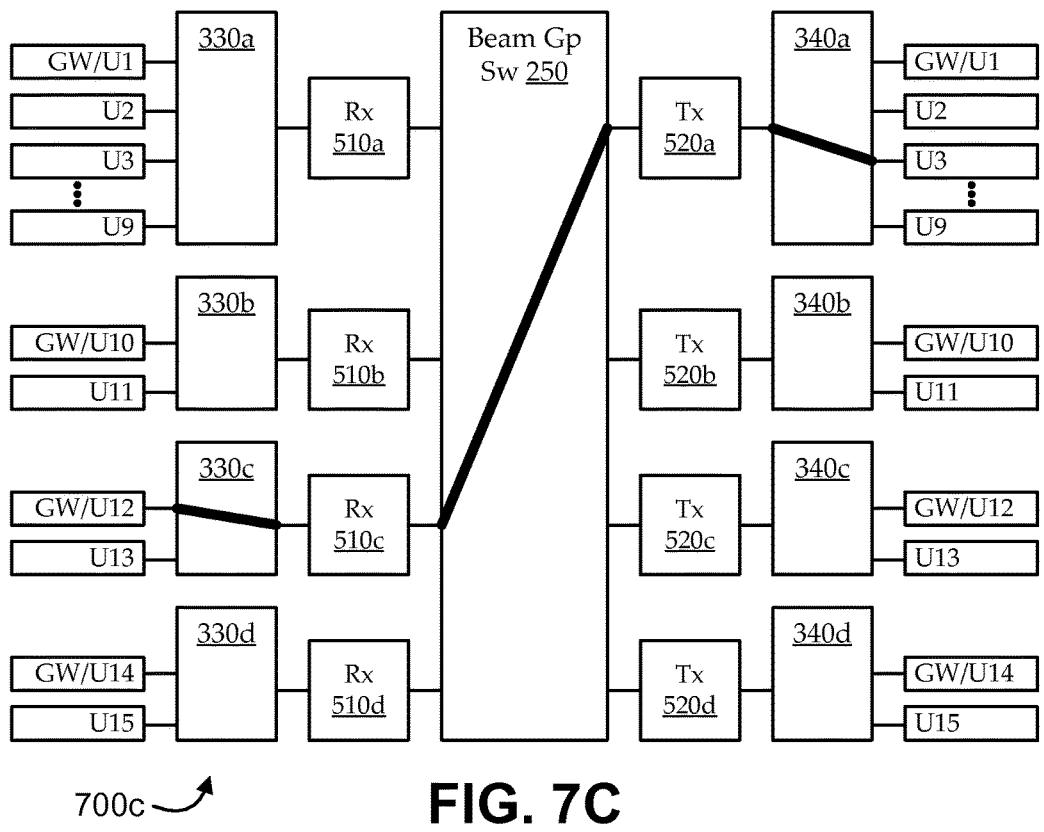
Figure 7D:
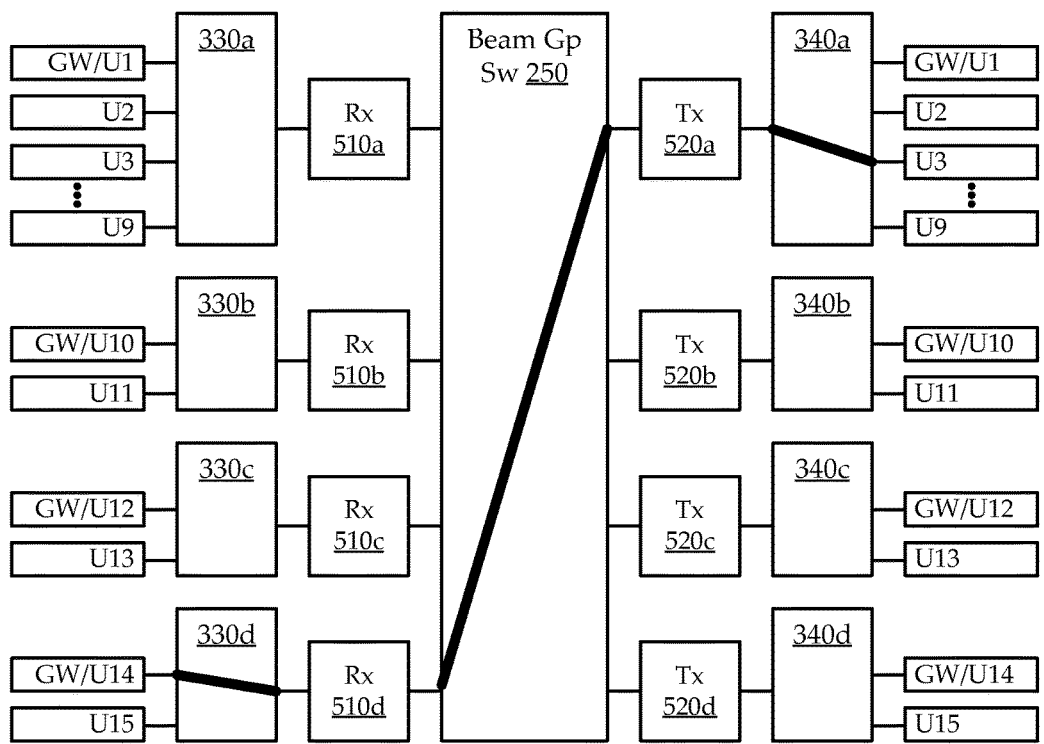

FIGS. 7A-7D show four configurations of an illustrative system 700 for sourcing forward-link capacity to a user beam in a shared manner among four gateway terminals. As illustrated, the system 700 includes four receive switches 330 and four transmit switches 340, coupled with a 4-by-4 beam group switching subsystem 250 via respective receive components 510 and transmit components 520. Each of FIGS. 7A-7D shows the system 700 in one of four possible configurations for sourcing forward-channel capacity to user terminals in beam 3 from each of four gateways (via respective beams). For example, FIG. 7A shows Gateway 1 (on beam 1) sourcing forward-channel capacity for users in beam 3, and FIG. 7B shows Gateway 2 (on beam 10) sourcing forward-channel capacity for users in beam 3. Only the relevant communication pathway through the system to users in beam 3 is shown for clarity, though users in other beam groups would typically be coupled gateways in other beam groups via the beam group switching subsystem 250 (e.g., as described above).

Figure 8A:
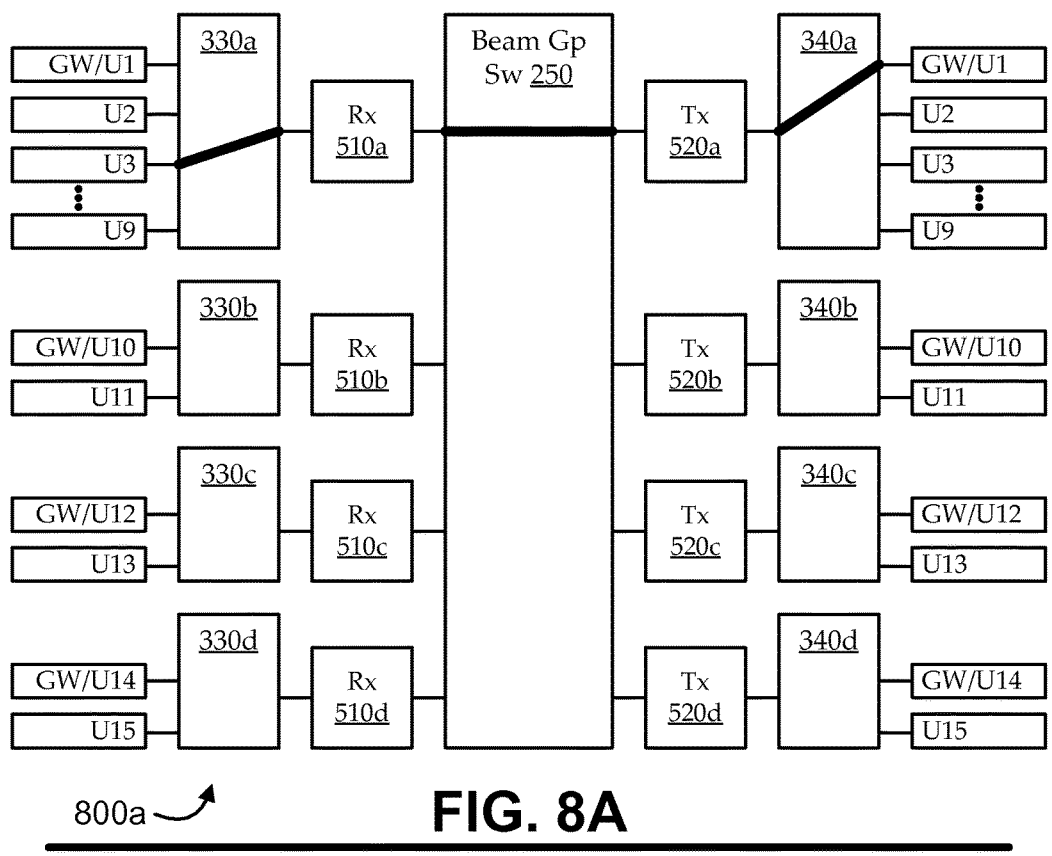
FIGS. 8A-8D show four configurations of an illustrative system for sinking return-link capacity from a user beam in a shared manner among four gateway terminals.
Figure 8B:
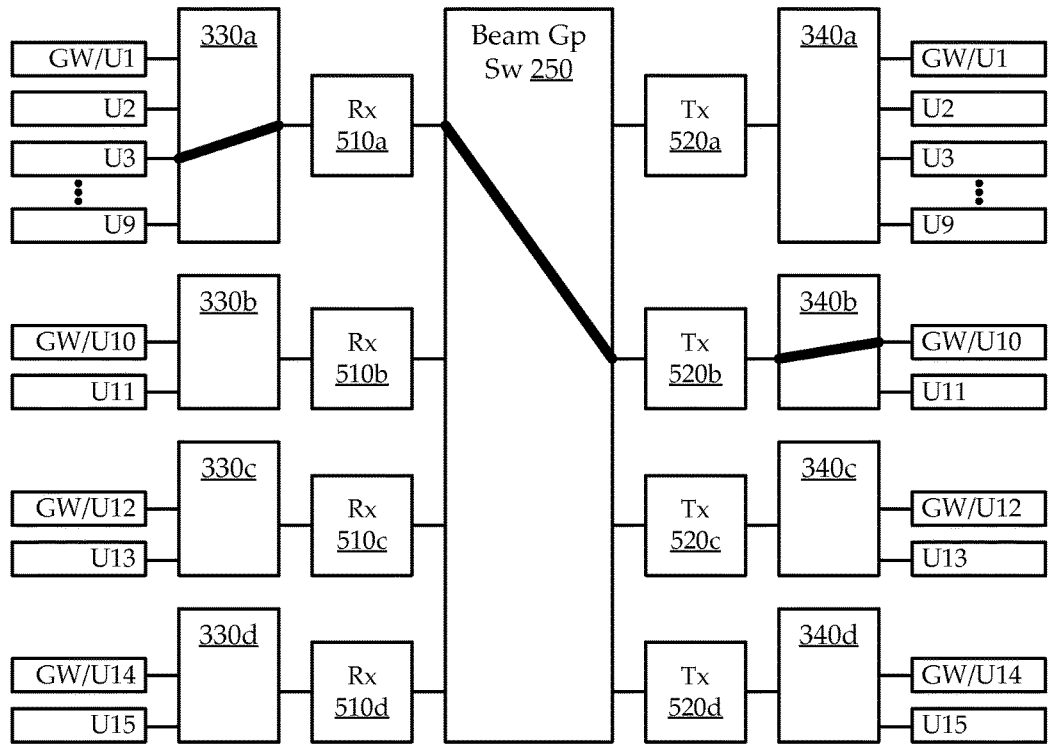
Figure 8C:
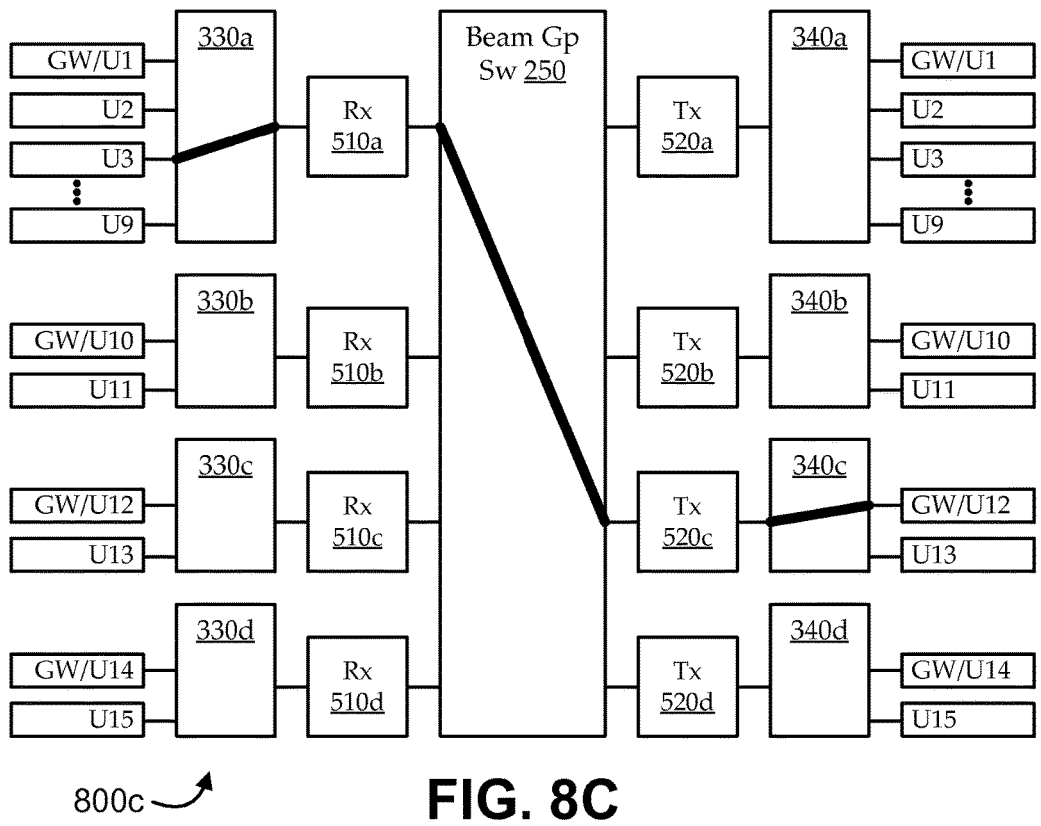
Figure 8D:
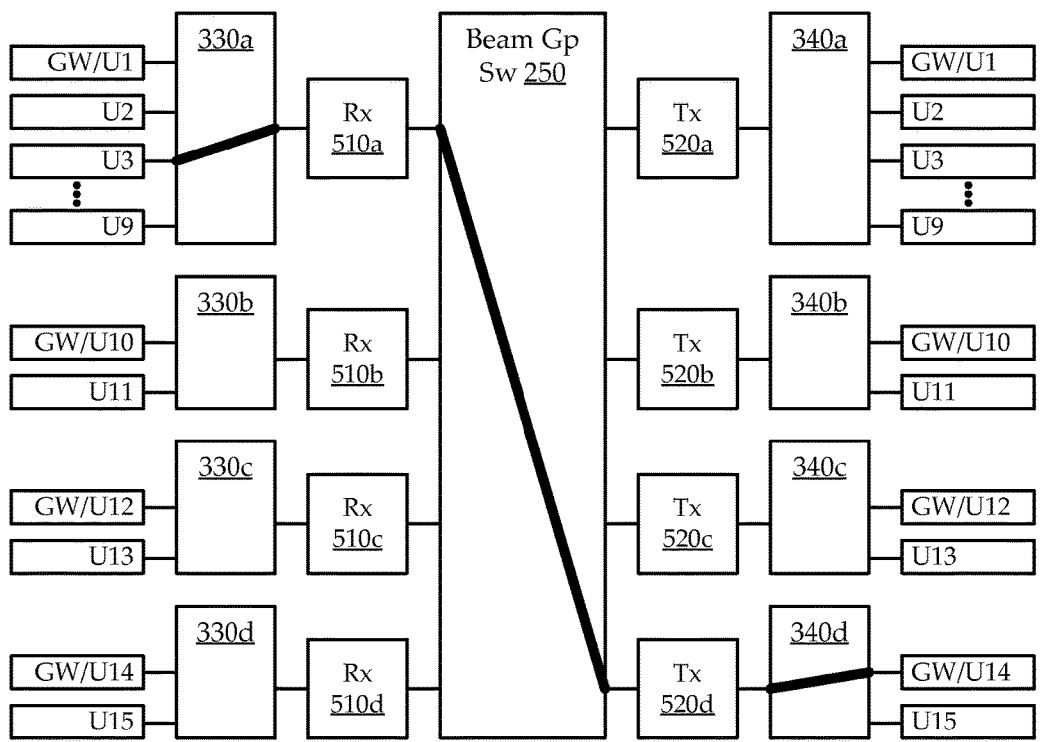

FIGS. 8A-8D show four configurations of an illustrative system 800 for sinking return-link capacity from a user beam in a shared manner among four gateway terminals. The system 800 of FIGS. 8A-8D is identical to the system 700 of FIGS. 7A-7D, except that it is configured for servicing return-channel traffic from user terminals in beam 3 from each of four gateways (via respective beams). For example, FIG. 8A shows Gateway 1 (on beam 1) sinking return-channel capacity for users in beam 3, and FIG. 8B shows Gateway 2 (on beam 10) sinking return-channel capacity for users in beam 3. Again, only the relevant communication pathway through the system from users in beam 3 is shown for clarity, though users in other beam groups would typically be coupled gateways in other beam groups via the beam group switching subsystem 250 (e.g., as described above).

Figure 9:
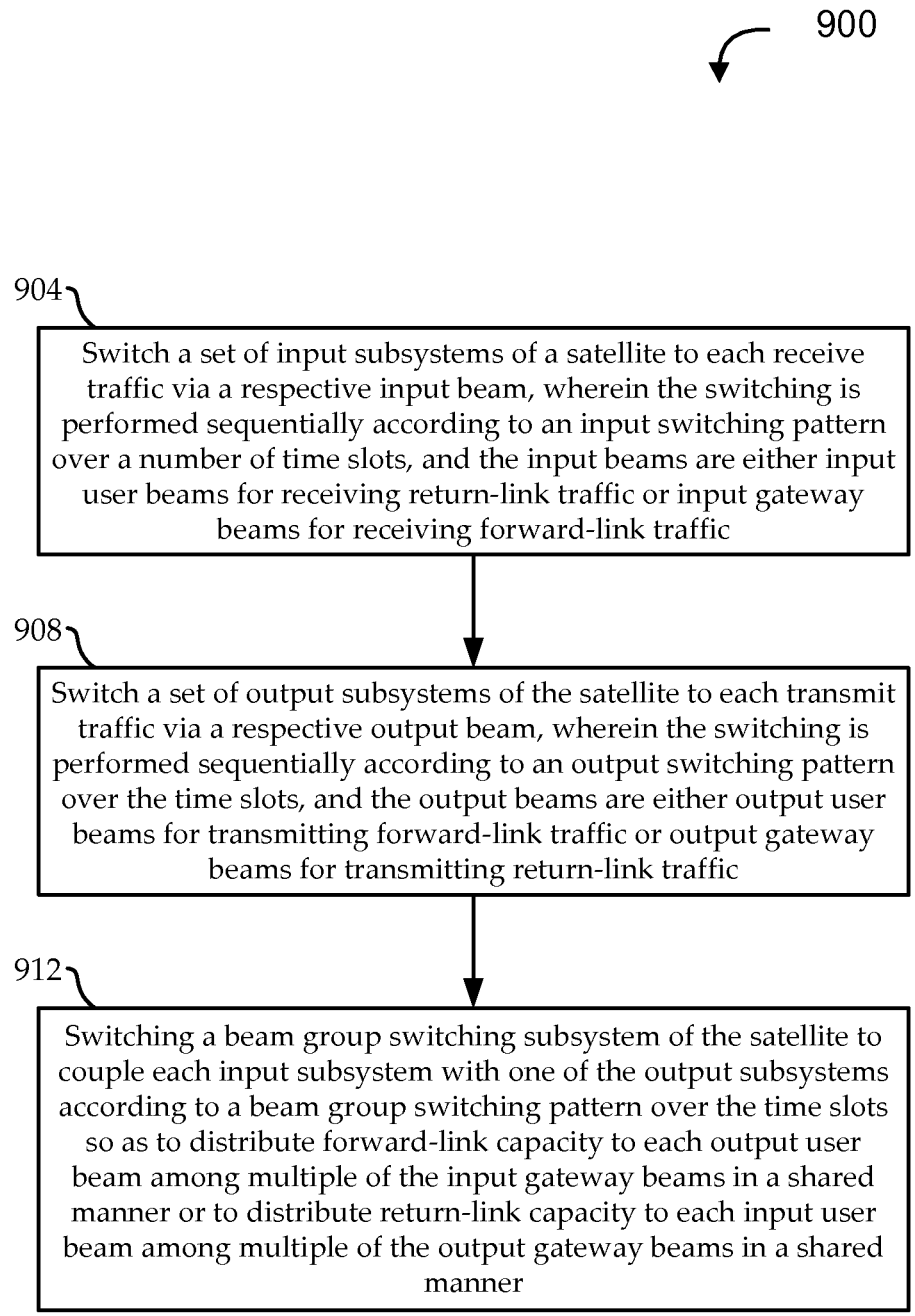
FIG. 9 shows a flow diagram of an illustrative method for robust sharing of gateway resources between gateway terminals and user terminals over fixed location beams, according to various embodiments.

FIG. 9 shows a flow diagram of an illustrative method 900 for robust sharing of gateway resources between gateway terminals and user terminals over fixed location beams, according to various embodiments. As described above, embodiments operate in context of a hub-spoke satellite architecture in which at least one satellite is in communication with multiple gateway and user terminals via input and output beams. Embodiments of the method 900 begin at stage 904 by sequentially switching a set of input subsystems of a satellite to each receive traffic via a respective input beam during each of a number of time slots according to an input switching pattern. For example, the satellite includes input subsystems that have respective receive switches that can switch among a number of associated input beams. Some beams can be input gateway beams for forward-link traffic (i.e., forward-channel uplink beams), and other beams can be input user beams for return-link traffic (i.e., return-channel uplink beams). The input switching pattern defines, at each time slot, which of the input beams is being used by each of the input subsystems for receiving traffic. Various implementations of the input switching pattern can change the configuration of the switches as frequently or as infrequently as desirable. For example, switching the input subsystems can involve switching at each time slot, switching periodically at equal intervals of time slots, or switching according to any other suitable pattern.

Embodiments of the method 900 continue at stage 908, by sequentially switching a set of output subsystems of the satellite to each transmit the traffic via a respective output beam during each of the time slots according to an output switching pattern. For example, the satellite includes output subsystems that have respective transmit switches that can switch among a number of associated output beams. Some output beams can be output gateway beams for return-link traffic (i.e., return-channel downlink beams), and other output beams can be output user beams for forward-link traffic (i.e., forward-channel downlink beams). The output switching pattern defines, at each time slot, which of the output beams is being used by each of the output subsystems for transmitting traffic. Various implementations of the output switching pattern can change the configuration as frequently or as infrequently as desirable. For example, the receive and transmit switches can change configuration at the same or different times, according to the same or different patterns, etc. (e.g., though typically synchronously with respect to the slot boundaries).

At stage 912, a beam group switching subsystem is sequentially switched at each of the time slots according to a beam group switching pattern, thereby coupling each input subsystem with one of the output subsystems during each time slot. For example, the satellite includes one or more beam group switching subsystems (e.g., matrix switches), each in communication with a respective set of input subsystems and set of output subsystems. Each input subsystem and each output subsystem is associated with one of a number of beam groups (e.g., each beam group having a number of beams, and each beam supporting one or more user and/or gateway beams), so that each beam group switching subsystem is associated with a set of beam groups corresponding to the beam groups of its respective set of input subsystems and set of output subsystems. Various implementations of the beam group switching pattern can change the configuration of the beam group switching subsystem as frequently or as infrequently as desirable. For example, all receive, transmit, and beam group switches can change configuration at the same time (e.g., substantially at each slot boundary). Alternatively, any of the receive, transmit, and beam group switches can differ in how often their respective configurations change to allow for many different switching configuration options. As used herein, "switching" the input subsystems, output subsystems, and/or beam switching subsystems can generally refer to changing or maintaining a particular configuration, and is not intended to be limited to altering one or more switches. For example, the beam group switching subsystem can be said to "switch" at each time slot, even if the configuration of connections between input and output subsystems does not change at each time slot.

Switching the beam group switching subsystem according to the beam group switching pattern distributes capacity to each user beam among multiple gateway beams in a shared manner. In various embodiments, the beam group switching pattern is configured (e.g., designed, optimized, etc.) toward one or more particular goals. Configuring the pattern toward a goal does not necessitate meeting that goal; rather, the goal can drive which decisions are made when facing trade-offs. In some embodiments, the beam group switching pattern is configured so that distributing the second aggregate capacity according to the beam group switching pattern when only Q of the P respective gateway terminals are operational minimizes worst-case degradation in aggregate over the output user beams (e.g., as in the "min-max" scenario described above).

In other embodiments, the beam group switching pattern is configured so that distributing the second aggregate capacity according to the beam group switching pattern when only Q of the P respective gateway terminals are operational prioritizes capacity distribution to a predetermined subset of output user beams. One technique for prioritizing capacity distribution is to configure the beam group switching pattern to distribute a relatively larger proportion of capacity to each of a number of designated high-priority output user beams among each of one or more high-priority input gateway beams in a shared manner. For example, one or more particular beam group switching subsystems can be designated for high-priority beams and can be in communication with the higher-reliability gateway beams and higher-priority user beams to facilitate coupling there-between. Alternatively, the switching pattern can be configured to allot more slots for higher-priority user beams to the higher-reliability gateway beams. Another technique for prioritizing capacity distribution is to increase gateway diversity for higher-priority user beams. The beam group switching subsystem can be switched according to the beam group switching pattern in such a way that distributes capacity to each high-priority output user beam among a relatively larger number of input gateway beams in a shared manner than to the output user beams not designated as high-priority output user beams. For example, a particular beam group switching subsystem facilitates sharing of capacity to its user beams among up to eight gateway beams. On average, higher-priority user beams have capacity servicing shared by more of the eight possible gateway beams (e.g., seven or eight), while lower-priority user beams have capacity servicing shared by fewer of the eight gateways (e.g., one or two). In this way, when any one gateway becomes non-operational, there is a lower magnitude of impact from the non-operational gateway on the aggregate capacity for the higher-priority user beams.

Other constraints can be placed on the beam group switching pattern (e.g., and on the input and/or output switching patterns). One such constraint is that satellite power requirements can limit which types of traffic can be supported in which ways. For example, implementations can be configured to balance forward-link draw and return-link draw according to satellite specifications. Another such constraint is that, in the hub-spoke architecture, traffic can be limited to flow from a gateway link to a user link or from a user link to a gateway link, but not from users to users or from gateways to gateways. For example, when an input subsystem is switched to receive from an input gateway beam, the beam group switching subsystem should couple that input system to an output subsystem switched to transmit on an output user beam. Accordingly, the beam group switching pattern can be configured so as to ensure hub-spoke types of communications (e.g., or to avoid disturbing those types of communications being facilitated by input and/or output switching patterns).

Figure 10:
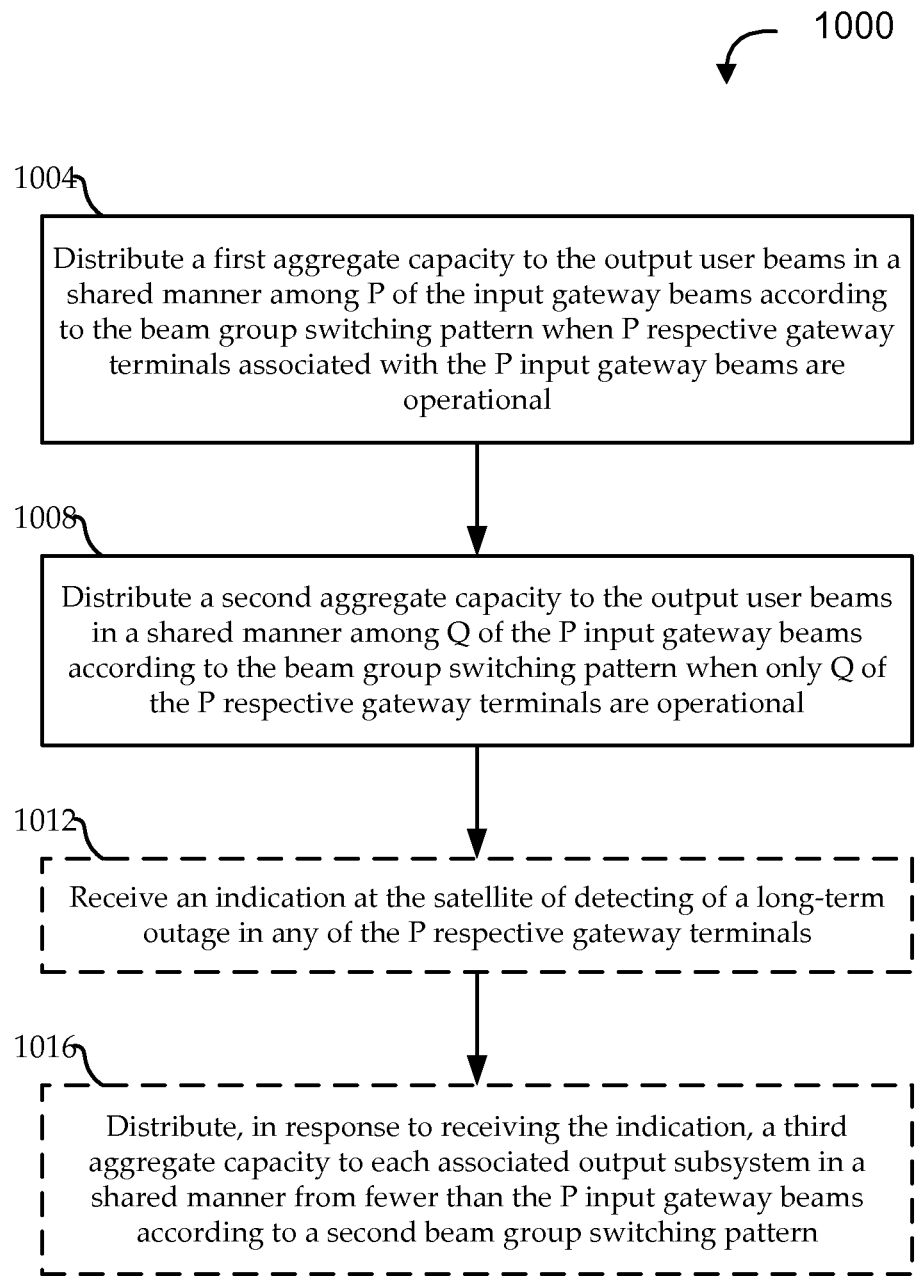
FIG. 10 shows a flow diagram of an illustrative method for distributing capacity to each output user feed from multiple of the gateway input feeds in a shared manner.

FIG. 10 shows a flow diagram of an illustrative method 1000 for distributing capacity to each output user beam from multiple of the gateway input beams in a shared manner. The method 1000 begins at stage 1004 by distributing a first aggregate capacity to the output user beams in a shared manner among P of the input gateway beams according to the beam group switching pattern when P respective gateway terminals associated with the P input gateway beams are operational. For example, the beam group switching subsystem is capable of coupling any of eight input gateway beams (associated with eight gateway terminals) to any of eight user output beams at any time slot for forward-link capacity distribution; and the beam group switching subsystem is capable of coupling any of eight output gateway beams (associated with eight gateway terminals) to any of eight user input beams at any time slot for return-link capacity distribution. For the sake of illustration, capacity for any particular user beam can be serviced in a shared manner by any or all eight of the gateway beams over the course of a frame of time slots.

At stage 1008, one or more gateway terminals becomes non-operational (e.g., temporarily), but capacity continues to be distributed according to the same beam group switching pattern. In particular, a second aggregate capacity is distributed to the output user beams in a shared manner among Q of the P input gateway beams according to the beam group switching pattern when only Q of the P respective gateway terminals are operational. For example, one gateway terminal experiences rain fade to an extent that it becomes temporarily non-operational, but the beam group switching subsystem continues to switch according to the robust beam group switching pattern. Ground segment components (e.g., core nodes, etc.) can redistribute traffic among the still-operational gateway terminals, but overall capacity is effectively reduced to a second capacity level. Still, the beam group switching pattern is designed to be robust enough so that the output user beams continue to have at least a minimum threshold amount of capacity (in aggregate).

In some embodiments, at stage 1012, the satellite receives an indication that a long-term outage in any of the P respective gateway terminals has been detected. For example, the ground segment detects a gateway malfunction (e.g., based on loopback traffic, or other techniques), and communicates an indication to the satellite, accordingly. In response to receiving the indication, at stage 1016, some embodiments distribute a third aggregate capacity to each associated output subsystem in a shared manner from fewer than the P input gateway beams (i.e., some or all of the remaining operable gateway terminals) according to a second (alternative) beam group switching pattern. In some implementations, the second beam group switching pattern is received via an input gateway beam (e.g., from one of the operable gateway terminals). In other implementations, the satellite has a set of one or more alternative second beam group switching patterns, and it can select an appropriate alternate pattern according to the indication (e.g., according to which gateway terminal is determined to manifest the long-term outage). For example, the alternative beam group switching pattern is optimized for the particular gateway outage, so that the third aggregate capacity can be greater than the second aggregate capacity. While the method 1000 focuses on forward-link capacity sharing, similar techniques can be applied to return-link capacity sharing, for example, as described herein.

Figure 11A:
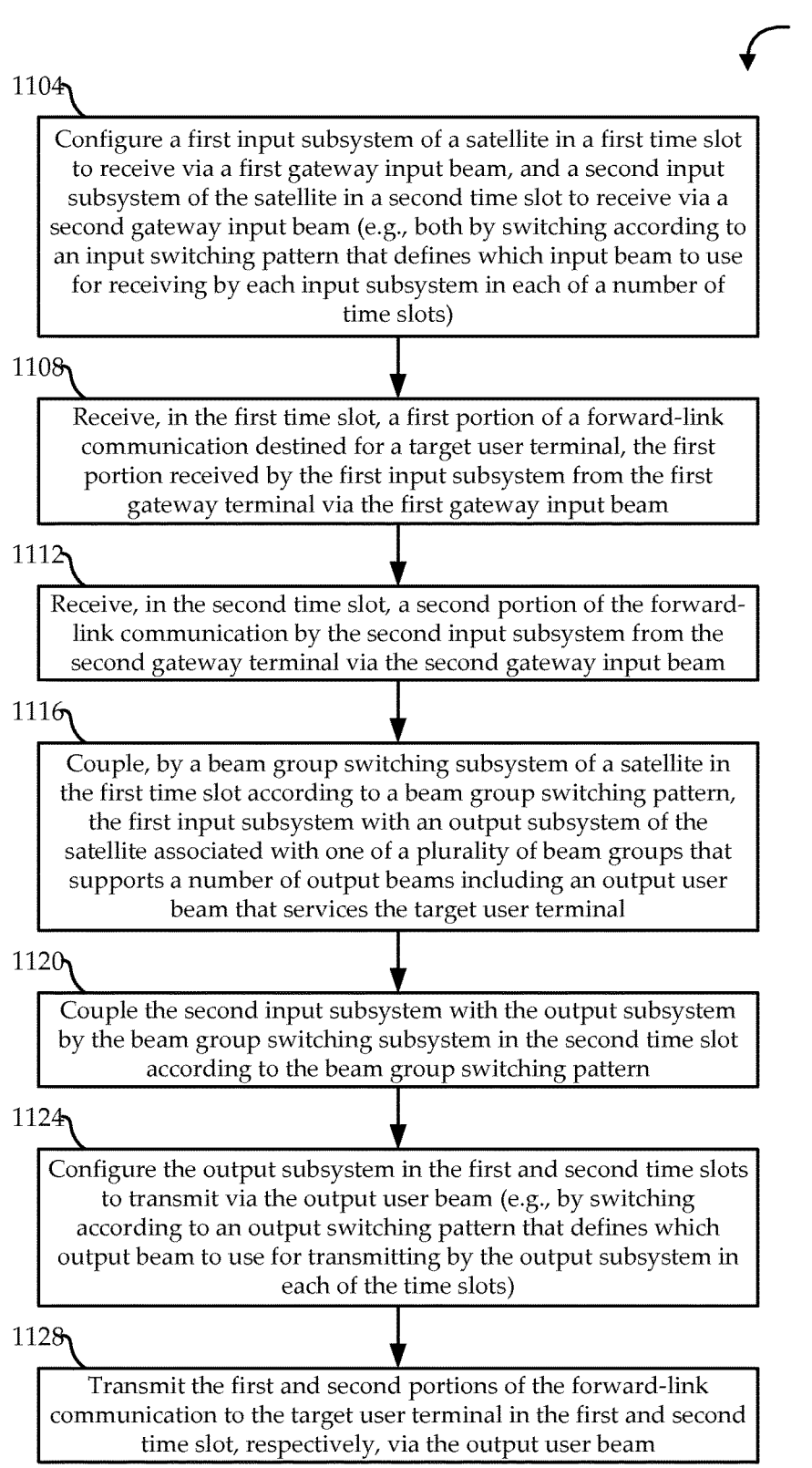
FIGS. 11A and 11B show flow diagrams of another illustrative method for robust sharing of gateway resources between gateway terminals and user terminals over fixed location beams in forward-link and return-link configurations, respectively, according to various embodiments.
Figure 11B:
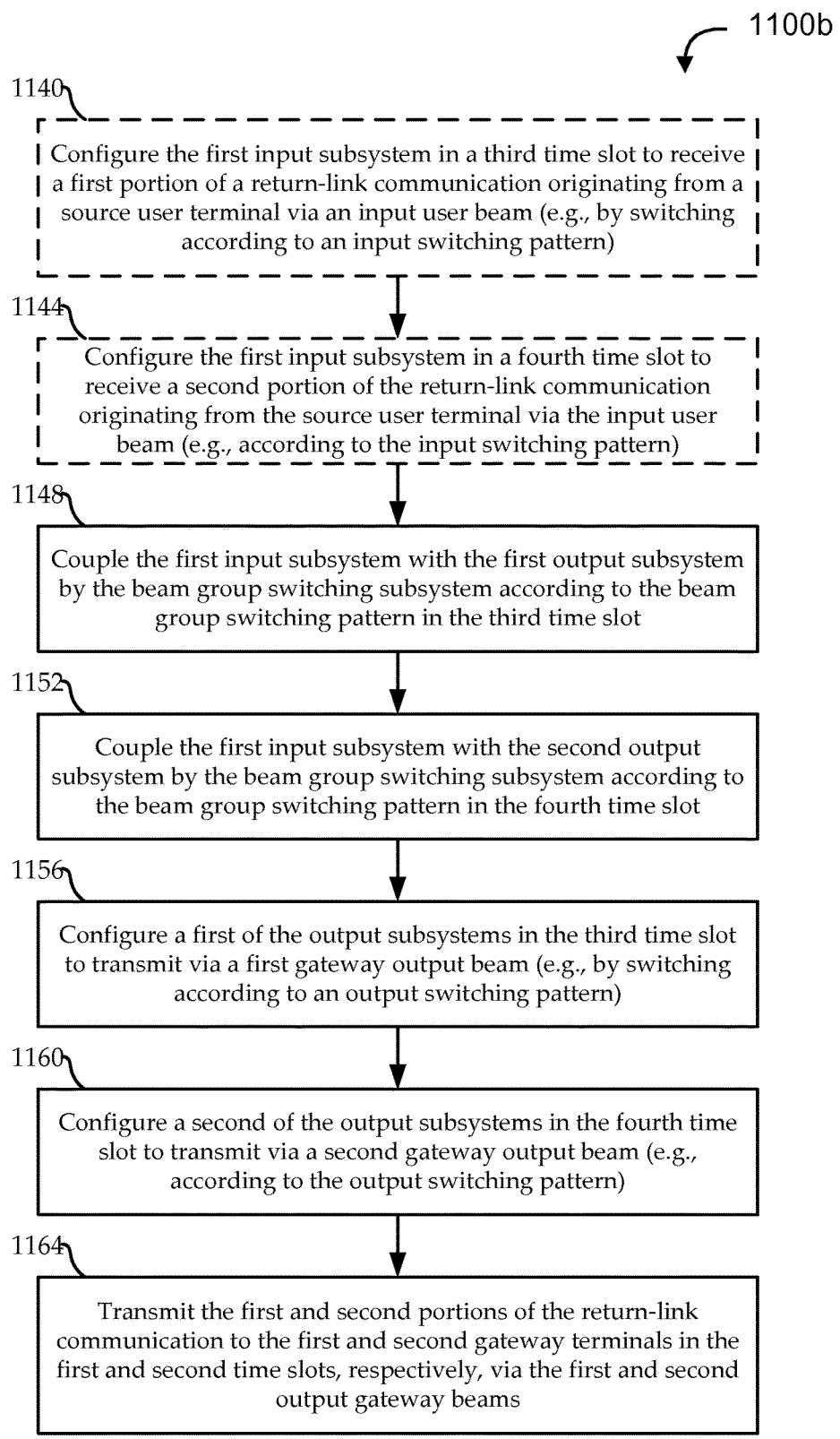

FIGS. 11A and 11B show flow diagrams of another illustrative method 1100 for robust sharing of gateway resources between gateway terminals and user terminals over fixed location beams in forward-link and return-link configurations, respectively, according to various embodiments. Beginning with FIG. 11A, embodiments begin at stage 1104 by configuring a first input subsystem of a satellite in a first time slot to receive via a first gateway input beam, and a second input subsystem of the satellite in a second time slot to receive via a second gateway input beam. In some implementations, configuring the input subsystems involves switching respective receive switches according to an input switching pattern that defines which input beam to use for receiving by each input subsystem in each of a number of time slots. For example, each input subsystem is associated with a beam group having respective gateway beams, including respective input gateway and output gateway beams for handling forward-link and return-link traffic, respectively. The beam group of each input subsystem can also have user beams, including respective input user and output user beams for handling return-link and forward-link traffic, respectively.

Stages 1108 and 1112 receive a forward-link communication destined for a target user terminal from two gateway beams at two time slots. At stage 1108, in a first time slot, a first portion of a forward-link communication is received by the first input subsystem from a first gateway terminal via the first input gateway beam. At stage 1112, in a second time slot, a second portion of the forward-link communication is received by the second input subsystem from a second first gateway terminal via the second input gateway beam.

Stages 1116 and 1120 configure a beam group switching subsystem to direct each of the two portions of the forward-link communication to an appropriate output subsystem in the two time slots. At stage 1116, in the first time slot, the beam group switching subsystem couples the first input subsystem with a particular output subsystem according to a beam group switching pattern. At stage 1120, in the second time slot, the beam group switching subsystem couples the second input subsystem with the particular output subsystem according to the beam group switching pattern. The particular output subsystem is associated with one of a number of beam groups that supports a number of output beams including an output user beam that services the target user terminal. The beam group switching pattern defines which input subsystem is coupled with which output subsystem in each time slot.

Stages 1124 and 1128 configure the output subsystem to transmit via the desired user beam during both of the time slots and transmit the traffic, accordingly. At stage 1124, the output subsystem is configured in the first time slot to transmit via the output user beam, and the output subsystem is configured in the second time slot to transmit via the output user beam. In some implementations, the output systems are configured by switching according to an output switching pattern that defines which of the output beams to use for transmitting by the output subsystem in each of the time slots. In one illustrative scenario, the first and second time slots are adjacent in time, and configuring the output system in the second time slot involves keeping the transmit switch of the output subsystem in the same configuration (e.g., to keep transmitting on the same output beam). In another illustrative scenario, the first and second time slots are non-adjacent in time, and configuring the output system in the second time slot involves switching the transmit switch in time slot two back to the configuration from time slot one (e.g., to return to transmitting on the output beam for the target user terminal). At stage 1128, the first and second portions of the forward-link communication are transmitted to the target user terminal in the first and second time slots, respectively, via the output user beam.

Continuing with FIG. 11B, the method 1100b proceeds to handle return-link traffic. At stage 1140, the first input subsystem is configured in a third time slot to receive a first portion of a return-link communication originating from a source user terminal via a user input beam. At stage 1144, the first input subsystem is configured in a fourth time slot to receive a second portion of the return-link communication originating from the source user terminal via the user input beam. In some implementations, the first input subsystem is switched at some or all time slots according to an input switching pattern. As described above, the third and fourth time slots may or may not be adjacent in time. Further, the third and fourth time slots may be before, after, or interspersed with the first and second time slots. For example, the order of time slots can be first, third, second, fourth; first, fifth, second, sixth, seventh, third, eighth, ninth, fourth; etc.

At stage 1148, the first input subsystem is coupled with the first output subsystem by the beam group switching subsystem according to the beam group switching pattern in the third time slot. At stage 1152, the first input subsystem is coupled with the second output subsystem by the beam group switching subsystem according to the beam group switching pattern in the fourth time slot. At stages 1156 and 1160, respectively, a first of the output subsystems is configured in the third time slot to transmit via a first gateway output beam, and a second of the output subsystems is configured in the fourth time slot to transmit via a second gateway output beam. For example, the output subsystems are configured by switching according to an output switching pattern. At stage 1164, the first and second portions of the return-link communication are transmitted to the first and second gateway terminals in the first and second time slots, respectively, via the first and second output gateway beams.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The various operations of methods and functions of certain system components described above can be performed by any suitable means capable of performing the corresponding functions. These means can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed Each can also be implemented, in whole or in part, with instructions embodied in a computer-readable medium, formatted to be executed by one or more general or application specific controllers. Embodiments can also be configured to support plug-and-play functionality (e.g., through the Digital Living Network Alliance (DLNA) standard), wireless networking (e.g., through the 802.11 standard), etc.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims

What is claimed is:

1. A method for robust sharing of gateway resources between a plurality of gateway terminals and a plurality of user terminals over a plurality of beams, the method comprising:
   receiving return-link communications at input subsystems of a satellite from a plurality of user terminals via a plurality of input beams;
   sequentially coupling at least one of the input subsystems with a plurality of output subsystems according to a beam group switching pattern in such a way that return-link capacity of each of at least a subset of the input beams is serviced in a shared manner by at least two of the output subsystems; and
   transmitting the return-link communications from output subsystems of the satellite to a plurality of gateway terminals via a plurality of output beams.

2. The method of claim 1, wherein:
   the receiving comprises:
   receiving, in a first time slot, a first portion of the return-link communication from a source user terminal by one of the input subsystems via an input user beam;
   receiving, in a second time slot, a second portion of the return-link communication from the source user terminal by the one of the input subsystems via the input user beam; and
   the sequential coupling comprises:
   coupling, in the first time slot according to the beam group switching pattern, the one of the input subsystems with a first output subsystem associated with a first of the output beams that services a first of the gateway terminals; and
   coupling, in the second time slot according to the beam group switching pattern, the one of the input subsystems with a second output subsystem associated with a second of the output beams that services a second of the gateway terminals.

3. The method of claim 2, wherein the transmitting further comprises:
   transmitting, in the first time slot, the first portion of the return-link communication to the first gateway terminal from the first output subsystem via the first output beam; and
   transmitting, in the second time slot, the second portion of the return-link communication to the second gateway terminal from the second output subsystem via the second output beam.

4. The method of claim 1, wherein the sequentially coupling further comprises:
   sequentially switching at least one of the output subsystems among its output beams according to an output switching pattern.

5. The method of claim 1, wherein the sequentially coupling further comprises:
   sequentially switching at least one of the input subsystems among its input beams according to an input switching pattern.

6. The method of claim 1, wherein:
   the sequentially coupling further comprises sequentially switching at least one of the output subsystems among its output beams according to an output switching pattern and sequentially switching at least one of the input subsystems among its input beams according to an input switching pattern; and
   the output switching pattern, the input switching pattern, and the beam group switching pattern together define which of the plurality of input beams is communicatively coupled with each of the plurality of output beams during each of a plurality of time slots in each of a plurality of frames.

7. The method of claim 6, wherein the sequentially coupling comprises switching a respective configuration of at least one of the input switching pattern, the output switching pattern, or the beam group switching pattern at each time slot.

8. The method of claim 6, wherein:
   at least one of the output switching pattern or the input switching pattern repeats for each of a plurality of first frames, each first frame comprising N time slots; and
   the beam group switching pattern repeats for each of a plurality of second frames, each second frame comprising M time slots; and
   N is not equal to M,
   wherein each of N and M is a variable number of the time slots.

9. The method of claim 6, wherein the sequential coupling comprises:
   communicatively coupling the plurality of input beams with each of the plurality of output beams during each of a plurality of time slots according to a first sequence that repeats for each of a first plurality of frames of a first super-frame; and
   communicatively coupling the plurality of input beams with each of the plurality of output beams during each of a plurality of time slots according to a second sequence that repeats for each of a second plurality of frames of a second super-frame.

10. The method of claim 1, wherein the sequentially coupling comprises:
    servicing a first return-link capacity of at least one input beam in a shared manner by P of the output beams according to the beam group switching pattern when P gateway terminals associated with the P output beams are operational; and
    servicing a second return-link capacity of the at least one input beam in a shared manner by Q of the P output beams according to the beam group switching pattern when only Q of the P gateway terminals associated with the P output beams are operational,
    wherein the second return-link capacity is at least a predetermined threshold capacity for providing communications services via the output beams of each associated output subsystem,
    wherein each of P and Q is a variable number of the gateway terminals and of the output beams.

11. The method of claim 10, wherein the second return-link capacity is approximately Q/P of the first return-link capacity.

12. The method of claim 1, wherein the beam group switching subsystem sequentially couples the at least one of the input subsystems with the output subsystems in such a way that:
    services a first return-link capacity in a shared manner using P of the associated output subsystems according to the beam group switching pattern when P gateway terminals are operational, the beam group switching pattern being a first beam group switching pattern;
    services a second return-link capacity in a shared manner using fewer than P of the associated output subsystems according to the first beam group switching pattern when any of the P gateway terminals is determined to have a short-term outage; and services a third return-link capacity in a shared manner using fewer than P of the associated output subsystems according to a second beam group switching pattern when any of the P gateway terminals is determined to have a long-term outage, wherein P is a variable number of the gateway terminals and of the associated output subsystems.

13. The method of claim 12, wherein the second beam group switching pattern is received via a gateway system in response to ground segment detection of the long-term outage.

14. The method of claim 12, wherein the second beam group switching pattern is one of a set of alternate beam group switching patterns stored at the satellite.

15. The method of claim 1, wherein the sequentially coupling is performed by one of a plurality of beam group switching subsystems of the satellite, each beam group switching subsystem associated with a respective at least one input subsystem and a respective plurality of output subsystems.

16. The method of claim 1, wherein the sequentially coupling is performed using a matrix switch having P inputs coupled with P input subsystems and P outputs coupled with P output subsystems, wherein P is a variable number of the inputs, input subsystems, outputs, and output subsystems.

17. The method of claim 16, wherein the matrix switch provides full P-by-P non-blocking cross-connectivity.

18. The method of claim 1, wherein the beam group switching pattern balances a forward link power draw of the satellite and a return-link power draw of the satellite in accordance with a satellite specification.

19. The method of claim 1, wherein the beam group switching pattern ensures that, for each sequential coupling of a particular input subsystem with a particular output subsystem, one of the particular input subsystem or the particular output subsystem is communicatively coupled with a user beam and the other of the particular input subsystem or the particular output subsystem is communicatively coupled with a gateway beam.

20. A system for robust sharing of gateway resources between a plurality of gateway terminals and a plurality of user terminals over a plurality of beams, the system comprising:

non-transient processor-readable storage disposed to store a beam group switching pattern;

a matrix switch, having a plurality of inputs disposed to couple with input subsystems of a satellite and having a plurality of outputs disposed to couple with output subsystems of a satellite, and disposed to couple the inputs with the outputs; and a processor disposed to switch the matrix switch according to the beam group switching pattern to sequentially couples each of the inputs to a respective one of the outputs during each of a plurality of time slots, such that:

forward-link capacity is provided in a shared manner by at least two of the input subsystems when forward-link communications are received at the input subsystems from at least two gateway terminals and transmitted via the output subsystems to at least one user terminal; and return-link capacity is serviced in a shared manner by at least two of the output subsystems when return-link communications are received at the input subsystems from at least one user terminal and transmitted via the output subsystems to at least two gateway terminals.

21. The system of claim 20, further comprising:

the satellite having:

input subsystems coupled with the inputs of the matrix switch and configured to receive communications via a plurality of input beams;

output subsystems coupled with the outputs of the matrix switch and configured to transmit the communications via a plurality of output beams.

22. The system of claim 21, wherein:

at least one of the input subsystems or at least one of the output subsystems comprises a switching subsystem configured to sequentially switch among its respective input beams or output beams according to a beam switching pattern.

23. The system of claim 22, wherein the beam switching pattern and the beam group switching pattern together define which of the plurality of input beams is communicatively coupled with each of the plurality of output beams during each of the plurality of time slots.

24. The system of claim 22, wherein:

the beam switching pattern repeats for each of a plurality of first frames, each first frame comprising N time slots; and the beam group switching pattern repeats for each of a plurality of second frames, each second frame comprising M time slots, wherein each of N and M is a variable number of the time slots.

25. The system of claim 24, wherein N equals M.

26. The system of claim 21, wherein:

at least one of the input subsystems and at least one of the output subsystems comprises a switching subsystem configured to sequentially switch among its respective input beams or output beams according to a beam switching pattern.

27. The system of claim 20, wherein the beam group switching subsystem sequentially couples the input subsystems with the output subsystems in such a way that:

provides first forward-link capacity in a shared manner by P of the input subsystems when forward-link communications are received via the P input subsystems from P operational gateway terminals;

provides first return-link capacity in a shared manner by P of the output subsystems when return-link communications are transmitted via the P output subsystems to P operational gateway terminals;

provides second forward-link capacity in a shared manner by Q of the P input subsystems when only Q of the P gateway terminals are operational; and provides second return-link capacity in a shared manner by Q of the P output subsystems when only Q of the P gateway terminals are operational, wherein each of P and Q is a variable number of the input subsystems, the output subsystems, and the gateway terminals.

28. The system of claim 27, wherein the second aggregate capacity is approximately Q/P of the first aggregate capacity.

29. The system of claim 27, wherein the beam group switching pattern provides the second forward-link capacity and the second return-link capacity when only Q of the P gateway terminals are operational in such a way that minimizes worst-case capacity degradation.

30. The system of claim 27, wherein the beam group switching pattern provides the second forward-link capacity and the second return-link capacity when only Q of the P gateway terminals are operational in such a way that prioritizes capacity distribution to a predetermined subset of beams.

31. The system of claim 20, wherein:
the second forward-link capacity and the second return-link capacity are provided when any of the P gateway terminals is determined to have a short-term outage;
the first forward-link capacity, the first return-link capacity, the second forward-link capacity, and the second return-link capacity are provided by the processor switching the matrix switch according to the beam group switching pattern, the beam group switching pattern being a first beam group switching pattern; and
the processor is further disposed to switch the matrix switch to:
provide third forward-link capacity in a shared manner by Q of the P input subsystems when any of the P gateway terminals is determined to have a long-term outage; and
provide third return-link capacity in a shared manner by Q of the P output subsystems when any of the P gateway terminals is determined to have a long-term outage,
wherein each of P and Q is a variable number of the input subsystems, the output subsystems, and the gateway terminals.

32. The system of claim 31, wherein the second beam group switching pattern is one of a set of alternate beam group switching patterns stored at the non-transient processor-readable storage.

33. The system of claim 20, wherein the matrix switch provides full non-blocking cross-connectivity between all its inputs and its outputs.

* * * * *

UNITED STATES PATENT AND TRADEMARK OFFICE
CERTIFICATE OF CORRECTION

PATENT NO. : 9,621,257 B2
APPLICATION NO. : 14/567854
DATED : April 11, 2017
INVENTOR(S) : John Hai O'Neill, Donald W. Becker and Mark J. Miller It is certified that error appears in the above-identified patent and that said Letters Patent is hereby corrected as shown below:

On the Title Page

Pages 1 and 2, Item (63) Related U.S. Application Data, delete ", which is a continuation of application No. 13/902,737, filed on May 24, 2013, now Pat. No. 8,805,275"

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*